United States Patent
Laskin et al.

(10) Patent No.: US 12,147,023 B1
(45) Date of Patent: Nov. 19, 2024

(54) OPTICS WITH EXTENDED DEPTH OF FIELD FOR IMAGING OBJECTS IN A WIDE FIELD OF VIEW WITH A PRE-SET PARALLAX

(71) Applicant: AdlOptica Optical Systems GmbH, Berlin (DE)

(72) Inventors: Alexander Laskin, Berlin (DE); Vadim Laskin, Berlin (DE)

(73) Assignee: AdlOptica Optical Systems GmbH, Berlin (DE)

( * ) Notice: Subject to any disclaimer, the term of this patent is extended or adjusted under 35 U.S.C. 154(b) by 212 days.

(21) Appl. No.: 18/085,165

(22) Filed: Dec. 20, 2022

(51) Int. Cl.
  *G02B 21/24* (2006.01)
  *G02B 5/30* (2006.01)
  *G02B 21/06* (2006.01)
  *H04N 23/56* (2023.01)
  *H04N 23/958* (2023.01)

(52) U.S. Cl.
  CPC .......... *G02B 21/241* (2013.01); *G02B 21/06* (2013.01); *H04N 23/56* (2023.01); *H04N 23/958* (2023.01); *G02B 5/3058* (2013.01)

(58) Field of Classification Search
  CPC ...... H04N 23/56; H04N 23/958; H04N 23/67; H04N 23/69; G02B 21/241; G02B 21/06; G02B 7/28; G02B 7/34; G02B 7/346; G02B 5/3058
  See application file for complete search history.

(56) References Cited

U.S. PATENT DOCUMENTS

| | | |
|---|---|---|
| 3,432,238 A | 3/1969 | Girard |
| 3,758,201 A | 9/1973 | MacNeille |
| 3,990,798 A | 11/1976 | White |
| 4,556,762 A | 12/1985 | Campbell |

(Continued)

OTHER PUBLICATIONS

Smith, Warren J., Modern Optical Engineering 3rd Edition, 2000, 154-157, McGraw-Hill, New York, US, 6 pages.

(Continued)

*Primary Examiner* — Kelly L Jerabek
(74) *Attorney, Agent, or Firm* — Brian S. Steinberger; Hilary F. Steinberger; Steinberger IP Law

(57) ABSTRACT

Systems, devices, apparatuses and methods for high quality imaging of objects in a wide field of view and broad spectral band with extended depth of field in the object space and with a pre-set parallax for objects located at different distances, for applications in photography, machine vision, optical inspection, and cinematography. Extension of the depth of field is achieved by imaging with a multi-focus optical system that simultaneously forms in its common image plane the images of the illuminated objects, which are spaced apart along the optical axis. Multifocality of the optical imaging system can be achieved with one or more multi-focus lenses made of birefringent optical materials, optical crystals or polymers with stress-induced birefringence, designed so the optic axis of the birefringent material of each of the multi-focus lenses forms an angle with its optical axis in the range from approximately 10° to approximately 90°. The aplanatic and achromatic optical design of the multi-focus optical system, high image quality in a wide field of view and broad spectral band over the entire extended common object field is achieved.

18 Claims, 10 Drawing Sheets

(56) References Cited

U.S. PATENT DOCUMENTS

| | | | |
|---|---|---|---|
| 4,981,342 | A | 1/1991 | Fiala |
| 5,175,651 | A | 12/1992 | Marron et al. |
| 5,495,096 | A | 2/1996 | Ogata et al. |
| 5,760,871 | A | 6/1998 | Kosoburd et al. |
| 5,867,315 | A | 2/1999 | Koike et al. |
| 6,414,791 | B1 | 7/2002 | Sugawara |
| 6,426,838 | B1 | 7/2002 | Rudeen |
| 6,741,760 | B2 | 5/2004 | Hayashi et al. |
| 9,550,455 | B2 | 1/2017 | Foley et al. |
| 10,518,358 | B1 | 12/2019 | Laskin et al. |
| 10,859,822 | B2 | 12/2020 | Zhang et al. |
| 10,948,638 | B2 | 3/2021 | Moore |
| 10,957,061 | B2 | 4/2021 | Le Guilloux |
| 11,108,951 | B2 | 8/2021 | Kurita et al. |
| 2013/0057673 | A1* | 3/2013 | Ferrer Moreu ........ G02B 21/06 359/388 |
| 2017/0024863 | A1* | 1/2017 | Sugimoto ................. G06T 5/20 |
| 2017/0205613 | A1* | 7/2017 | Fukuyama ........... G02B 21/244 |
| 2020/0077015 | A1* | 3/2020 | Watanabe ............ H04N 23/958 |

OTHER PUBLICATIONS

Smith, Warren J., Modern Optical Engineering 3rd Edition, 2000, Chapter 2 Image Formation (First-Order Options), pp. 21-27, McGraw-Hill, New York, US, 9 pages.

Edmund Optics Worldwide, Techspec High Resolution Lenses For 1" and 4/3" Sensors #86-574 50mm, 2011, 5 pages.

\* cited by examiner

FIG. 9A
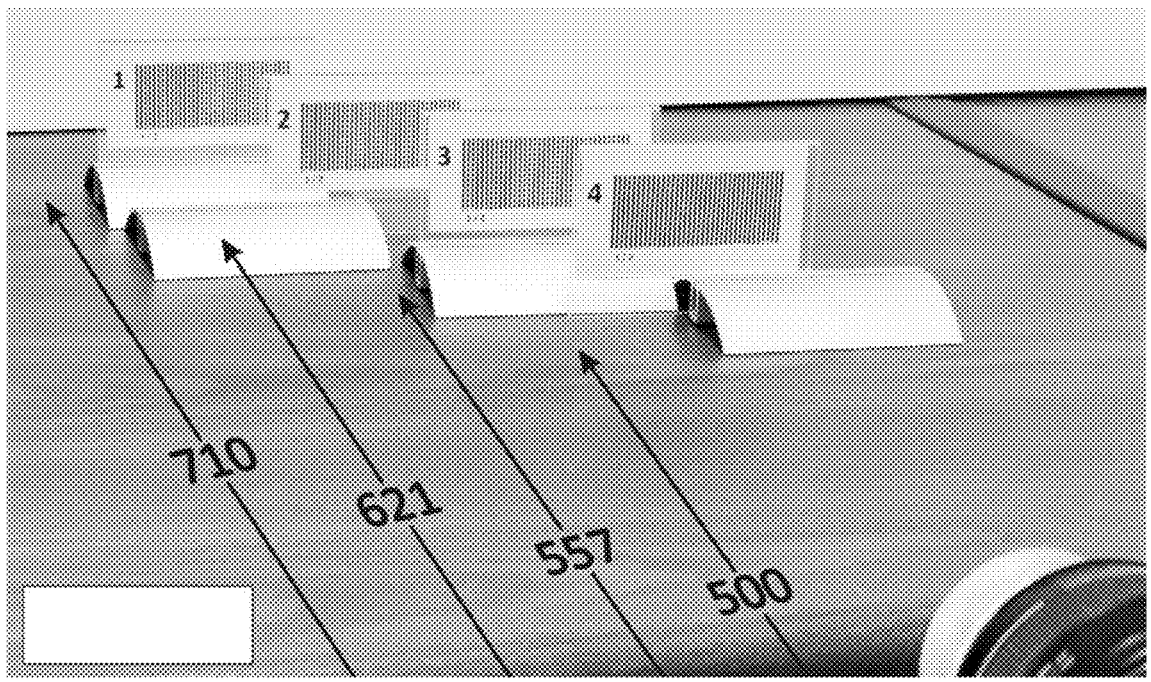
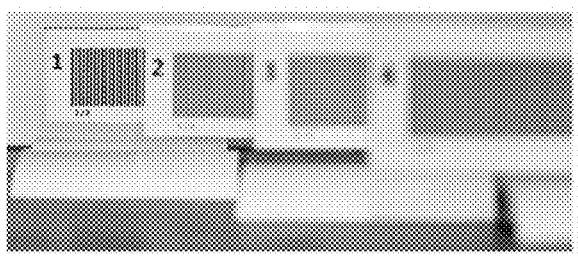
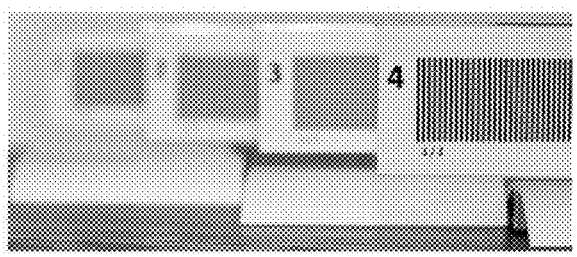
*FIG. 9B*  *FIG. 9C*
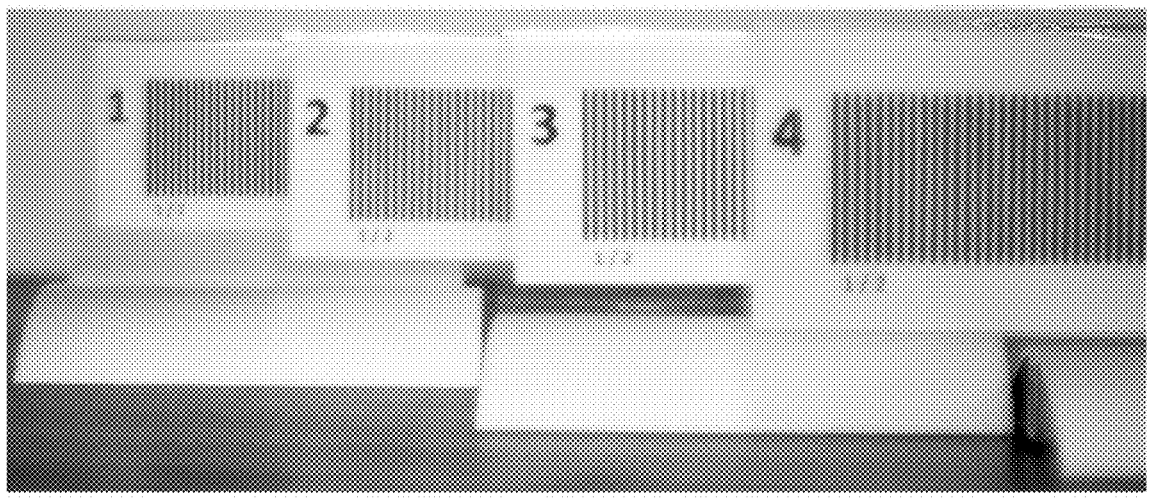
*FIG. 9D*

OPTICS WITH EXTENDED DEPTH OF FIELD FOR IMAGING OBJECTS IN A WIDE FIELD OF VIEW WITH A PRE-SET PARALLAX

FIELD OF INVENTION

This invention relates to imaging of objects, and in particular to systems, apparatus, devices, and methods for high quality imaging photography, machine vision, cinematography, inspection optical systems, and, in particular, for extending the depth of field while maintaining the image sharpness and contrast required in the specific applications.

BACKGROUND TO THE INVENTION

Extending the depth of field of imaging optics is a relevant and important technical task in plenty of applications in various photographic techniques, industrial and scientific machine vision systems, including inspection optical systems based on telecentric optics, as well as in various cinematographic techniques that provide specific visual effects.

Methods and devices of increasing the depth of field based on the use of longitudinal chromatic aberration of an optical system are described in U.S. Pat. No. 6,741,760 to Hayashi et al., and U.S. Pat. No. 10,948,638 to Moore, all incorporated by reference in their entirety.

Common disadvantages of these technical solutions include a small factor of increasing the depth of field, which is limited by the dispersion properties of typical optical materials, a decrease in image quality owing to lateral chromatic aberration that inevitably accompany longitudinal chromatic aberration, the inability to vary the sharing the light energy portions in separate focuses and vary the parallax for objects located at different distances along the optical axis. The technical solution according to U.S. Pat. No. 10,948,638 to Moore presumes the need to implement the spatial separation of the lens aperture into areas that are transparent in certain spectral bands, which leads to a decrease in physical resolution and vignetting for off-axis images, and also increases complexity of optical design and makes it incompatible to operate with iris diaphragms necessary to vary F-number of an optical system, since a change in the diaphragm diameter results in variable clipping of various parts of the entire aperture.

Another method for extending depth of field is based on the use of Diffractive Optical Elements (DOE), particularly multifocal DOE; implementation examples of these methods are described in U.S. Pat. No. 5,495,096 to Ogata et al., and U.S. Pat. No. 5,760,871 to Kosoburd et al., all incorporated by reference in their entirety.

Common disadvantages of DOE-based optical systems include high initial manufacturing costs, limited efficiency due to light losses in high diffraction orders, narrow field of view owing to aberrations, strong chromatic aberrations reducing the image quality, inability to vary the distribution of light energy portions in separate focuses and control the parallax for objects located at different distances along the optical axis, and high sensitivity of DOE performance to deviation of the input beam size or a change in wavelength.

Another method of simultaneous imaging objects located at different distances is based on the use of Fresnel lenses, different aperture portions of which have different focal lengths. An implementation example of this technical solution is described in U.S. Pat. No. 10,859,822 to Zhang et al., incorporated by reference in their entirety.

Typical disadvantages of this imaging approach are a narrow field of view due to off-axis aberrations, chromatism, low physical resolution, since only parts of the entire aperture are used to form images of objects located at different distances, sensitivity to misalignments, incompatibility to operate with iris diaphragms necessary to vary F-number of an optical system, since a change in diaphragm diameter results in a variable clipping of various parts of the entire aperture, and inability to vary the sharing the light energy portions in separate focuses and vary the parallax for objects located at different distances along the optical axis.

Another multi-focus optical system with a spatial division of the working aperture into parts with different focal lengths is used to focus laser radiation in several focuses along the optical axis; an example of this approach is described in U.S. Pat. No. 6,426,838 to Rudeen, incorporated by reference in its entirety.

As technical solutions intended for on-axis focusing of laser beams, they exhibit strong off-axis aberrations and chromatism that narrow field of view. And, therefore, cannot be applied in imaging applications. Other disadvantages of these technical solutions are incompatibility to operate with iris diaphragms necessary to vary F-number of an optical system, and inability to control the parallax for objects located at different distances along the optical axis.

Imaging with extended depth of field is accomplished with multi-focus optical systems comprising arrays of microlenses with different focal lengths, focusing multiple overlapping images onto a sensing device with an array of pixels, further image processing using proprietary algorithms allows reconstructing the entire image; examples of such technical solutions, also called plenoptic optical systems, are described in U.S. Pat. No. 9,550,455 to Foley et al., 10,957,061 to Le Guilloux, all incorporated by reference in their entirety.

Because of the implementation features associated with the overlap of neighbouring images, these technical solutions are characterized by a relatively small field of view and physical resolution owing to off-axis and chromatic aberrations, and this narrows the range of potential applications.

The solution according to U.S. Pat. No. 9,550,455 to Foley et al., which is incorporated by reference in their entirety, is proposed for use only in vehicle control systems.

In these technical solutions, it is impossible to control the parallax. On the other hand, the need to develop and use specific proprietary image processing software limits the widespread use of these methods.

Stereoscopic optical effects achieved through parallax images are used in photography and cinematography to create a sense of three-dimensional space.

An example of the technique is described in U.S. Pat. No. 6,414,791 to Sugawara, incorporated by reference in its' entirety, is an optical system comprising a zoom objective and a special mirror system, time-serially parallax images are obtained by sequential switching of the shutters.

This and similar technical solutions do not allow creating simultaneous parallax imaging, on the other hand, the complexity of the optical systems limits their wide use in practice.

There are described several multi-focus optical systems comprising a lens or lenses made of birefringent materials.

Optical systems for microscopy, spectroscopy and reading-out data from optical disks (CD, SD) comprising cemented doublets with birefringent lenses are described in U.S. Pat. No. 3,432,238 to Girard, U.S. Pat. No. 3,990,798 to White, U.S. Pat. No. 4,566,762 to Kato and U.S. Pat. No. 5,867,315 to Koike, et al., all incorporated by reference in their entirety.

Some disadvantages of these technical solutions are the narrow field of view determined by the conditions of applications and the achievable aberration correction, mandatory use of cemented doublets, chromatism that limits the achievable physical resolution, and inability to solve the problem of extending the depth of field, since the main purpose of these methods is to simultaneously image two planes, such as substrate layers, spaced apart along the optical axis. Additional disadvantages include incompatibility to operate with iris diaphragms necessary to vary F-number of an optical system, and inability to control the parallax for objects located at different distances from each other along the optical axis.

U.S. Pat. No. 4,981,342 to Fiala and U.S. Pat. No. 3,758,201 to MacNeille, all incorporated by reference in their entirety, describe multifocal optical systems for ophthalmic applications that comprise optical elements with cemented lenses of birefringent materials.

Some disadvantages of these technical solutions are a narrow field of view, limited by the achievable correction of aberrations and chromatism, mandatory use of cemented optical elements, inability to vary the sharing of light energy portions in individual focuses and control the parallax for objects located at different distances along the optical axis.

The technical solution described in U.S. Pat. No. 3,758,201 to MacNeille is intended to produce images of only two object planes spaced apart along the optical axis, without extending the depth of field.

U.S. Pat. No. 10,518,358 to Laskin et al., incorporated by reference in their entirety, describes various multifocal optical systems for laser material processing comprising lenses made of birefringent materials.

As technical solutions intended to focus laser beams on-axis and in proximity to the optical axis, they are characterized by a narrow field of view and chromatism, and inability to vary the parallax for objects located at different distances along the optical axis. Therefore, they are not suitable for the use in modern imaging applications.

An optical system for imaging in two focuses spaced apart along the optical axis and comprising a single birefringent lens is described in U.S. Pat. No. 5,175,651 to Marron, et al., incorporated by reference in their entirety.

According to this patent, this birefringent lens is typically a doublet lens with two lenses bonded together.

Some embodiments of this technical solution are implemented with a polarization filter mounted ahead of the optical system and used to control the relative intensity of two separate scenes. The described optical systems with birefringent lenses are characterized by a narrow field of view due to off-axis and chromatic aberrations, limited possibility to extend the depth field owing to the simultaneous focusing in only two focuses spaced apart along the optical axis, and inability to control the parallax for objects located at different distances along the optical axis.

Conventional methods and devices are not optimal for imaging with an extended depth of field for objects in a wide field of view and broad spectral band for modern imaging applications of photography, machine vision, cinematography, optical inspection with the required image quality in these applications and a pre-set parallax for objects located at different distances along the optical axis.

As such, efficient affordable methods, apparatuses and systems are needed that can provide a level of aberration correction which is typical for aplanatic and achromatic optical systems, operation in a wide field of view and broad spectrum required in modern imaging applications, extending depth of field in the object space while maintaining a pre-determined image sharpness and contrast throughout the entire extended depth of the object field, ability to switch between the imaging modes of broad continuous extended depth of field and imaging separate individual scenes, and imaging with a pre-set parallax for objects located at different distances along the optical axis.

Thus, the need exists for solutions to the above problems with the prior art.

SUMMARY OF THE INVENTION

A primary objective of the present invention is to provide systems, devices, apparatuses and methods for high quality imaging of objects in a wide field of view and broad spectral band with extended depth of field in the object space and with a pre-set parallax for objects located at different distances, advantageously for applications in photography, machine vision, optical inspection, cinematography.

This technical task is solved by providing illumination of the object space with light of the intensity and polarization state optimal for producing images with the sharpness and contrast required in the imaging applications, use of a Multi-Focus Optical System that forms in its Common Image Plane the images of objects that are located in the object space with an extended depth of field and providing a pre-set parallax for objects located at different distances, capturing and saving the combined image formed in the Common Image Plane by an Image Pickup Device, the sensing plane of which is aligned with the said Common Image Plane.

The Multi-Focus Optical System has an aplanatic and achromatic optical design characterized by correction of not only spherical aberration, coma and astigmatism, but also chromatic aberrations for high quality imaging in a wide field of view and broad spectral band over entire extended depth of field in the object space.

To realize two or more focuses spaced along the optical axis, the optical system can include one or more multi-focus lenses made of birefringent optical materials, advantageously optical crystals or polymers with stress-induced birefringence.

The optical design of each multi-focus lenses can be implemented in such a way that the optic axis of its birefringent material forms an angle in the range from approximately 10° to approximately 90° with the optical axis of the lens.

The Multi-Focus Optical System forms simultaneously in its Common Image Plane the images of objects that are located in two or more Object planes at different distances and optically conjugate to the Common Image Plane.

Images of various objects located in the Object Fields along the optical axis in proximity to the said Object planes are characterized by the sharpness and contrast required in the imaging applications. And the combination of the said Object Fields forms a Common Object Field, which is characterized by the extended depth of field in the object space.

The optical design of the Multi-Focus Optical System can be implemented in such a way that values of transverse magnification and distortion provide a pre-set parallax for the Objects, which are located at different distances and are optically conjugate to the Common Image Plane of the Multi-Focus Optical System.

In the Common Image Plane, a combination of images from multiple objects located at different distances along the optical axis is captured and saved using the Image Pickup Device, which is implemented as a photo or a motion-picture camera with either a film or an electronic image sensor with a matrix of pixels.

A secondary objective of the present invention is to provide systems, devices, apparatus and methods for high quality imaging objects in a wide field of view and broad spectral band with an extended depth of field and a pre-set parallax, wherein the Illumination System provides separate lighting with polarized light for different Object planes, and the polarization directions of the lightings applied to adjacent Object planes are orthogonal to each other.

A third objective of the present invention is to provide systems, devices, apparatus and methods for high quality imaging objects in a wide field of view and broad spectral band with an extended depth of field and a pre-set parallax.

Wherein Common Object Field has extended depth due to combining multiple Object Fields located along the optical axis in proximity to the Object planes optically conjugate to the Common Image Plane of the Multi-Focus Optical System.

Advantageously, the Common Object Field is continuous and broad along the optical axis due to overlapping the adjacent Object Fields, or provides simultaneously imaging of individual scenes spaced apart in the object space.

A fourth objective of the present invention is to provide systems, devices, apparatus and methods for high quality imaging objects in a wide field of view and broad spectral band with an extended depth of field and a pre-set parallax.

Wherein the Multi-Focus Optical System can include two or more multi-focus lenses, and at least one of these lenses is rotatable around the optical axis to optimize the conditions for sharp and contrast imaging either for a broad Continuous Common Object Field with extended depth or for individual scenes spaced apart in the object space.

Advantageously, but not limited to, the Multi-Focus Optical System can be implemented as a multi-focus objective, or as a combination of a conventional single-focus objective and a multi-focus optical Module Extending Depth of Field including one or more rotatable multi-focus lenses made of birefringent optical materials.

And the conventional single-focus objective can be implemented as a zoom objective with variable focal length within a pre-determined range.

To ensure the high image quality required in imaging applications, all of the above described implementations of the Multi-Focus Optical Systems can have aplanatic and achromatic optical designs characterized by corrected spherical aberration, coma, astigmatism and chromatic aberrations for wide a field of view by imaging in a broad spectral band over the entire range of focal lengths.

A fifth objective of the present invention is to provide systems, devices, apparatus and methods for high quality imaging objects in a wide field of view and broad spectral band with an extended depth of field and a pre-set parallax.

Wherein the Multi-Focus Optical System can be implemented as a telecentric objective with one or more multi-focus concentric meniscus lenses made of birefringent optical materials.

Centers of curvature of the spherical surfaces of the said multi-focus concentric meniscus lenses can coincide with the center of diaphragm or aperture stop of the said telecentric objective.

The telecentric objectives are implemented as optical systems with telecentricity either in object space, when the principal rays of light beams are parallel to the optical axis in the space before the objective, or in image space, when the principal rays of light beams are parallel to the optical axis in the space after the objective, or simultaneously in object space and in image space, when the principal rays of light beams are parallel to the optical axis both before and after the objective.

In all implementations, the Multi-Focus Optical Systems are characterized in principle by zero parallax for objects located at different distances because the centers of curvature of the spherical surfaces of the multi-focus concentric meniscus lenses coincide with the center of the diaphragm or aperture stop.

A sixth objective of the present invention is to provide systems, devices, apparatus and methods for high quality imaging objects in a wide field of view and broad spectral band with an extended depth of field and a pre-set parallax.

Wherein the Image Pickup Device can include a polarization-sensitive electronic image sensor, which is implemented in such a way that its different pixels preferentially pick up light polarized in different directions.

The combination of the Illumination System providing separate lighting by polarized light with different polarization directions for different Object planes and the said polarization-sensitive electronic image sensor makes it possible to enhance the image contrast in the Common Image Plane of the Multi-Focus Optical System.

A seventh objective of the present invention is to provide systems, devices, apparatus and methods for high quality imaging objects in a wide field of view and broad spectral band with an extended depth of field and a pre-set parallax.

Wherein the Multi-Focus Optical System can include a rotatable wire-grid polarizer optimized for the working spectral band and installed either before, inside, or after the Multi-Focus Optical System; and rotation of this wire-grid polarizer is used to enhance the image contrast and sharpness in the Common Image Plane of the Multi-Focus Optical System for images of the Objects located at different distances in the object space.

An eighth objective of the present invention is to provide systems, devices, apparatus and methods for high quality imaging objects in a wide field of view and broad spectral band with an extended depth of field and a pre-set parallax.

Wherein the Multi-Focus Optical System can include a rotatable waveplate installed either before, inside, or after it; and rotation of this waveplate is used to enhance, without loss of energy, the contrast and sharpness in the Common Image Plane of the Multi-Focus Optical System for images of Objects located at different distances in the object space.

There are described embodiments of the systems, devices, apparatus and methods for high quality imaging objects in a wide field of view and broad spectral band with an extended depth of field and a pre-set parallax.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

The invention is illustrated, without limitation, by the accompanying drawings showing schematic diagrams, ray tracing for principal rays in optical systems with extended depth of field and pre-set parallax implemented according to the present invention. The drawings are briefly described below.

FIG. 3A—the conventional telecentric objective composed from two lens groups; FIG. 3B—the non-limiting embodiment of the present invention comprising the Multi-Focus Optical System with two multi-focus concentric meniscus lenses, providing a Common Image for four Objects with zero parallax.

FIG. 9A, FIG. 9B, FIG. 9C and FIG. 9D show experimental photographs of imaging four separate Objects in form of Grid Targets by the optical systems shown in FIG. 8A and FIG. 8B: FIG. 9A shows the experimental layout, FIG. 9B and FIG. 9C show imaging using the conventional objective with sharp images of, respectively, 1st and 4th Objects, FIG. 9D shows the Common Image of all four Objects with acceptable imaging quality when the Continuous Common Object Field is provided.

FIG. 10A shows the relative positioning of the Objects and distances to the imaging optics, FIG. 10B and FIG. 10C show imaging using a conventional objective with a sharp image of one of the Objects, FIG. 10D shows the Common Image for both Objects using the optical system according to FIG. 2B providing the sharp images of spaced apart objects.

DESCRIPTION OF THE PREFERRED EMBODIMENTS

Figure 1A:
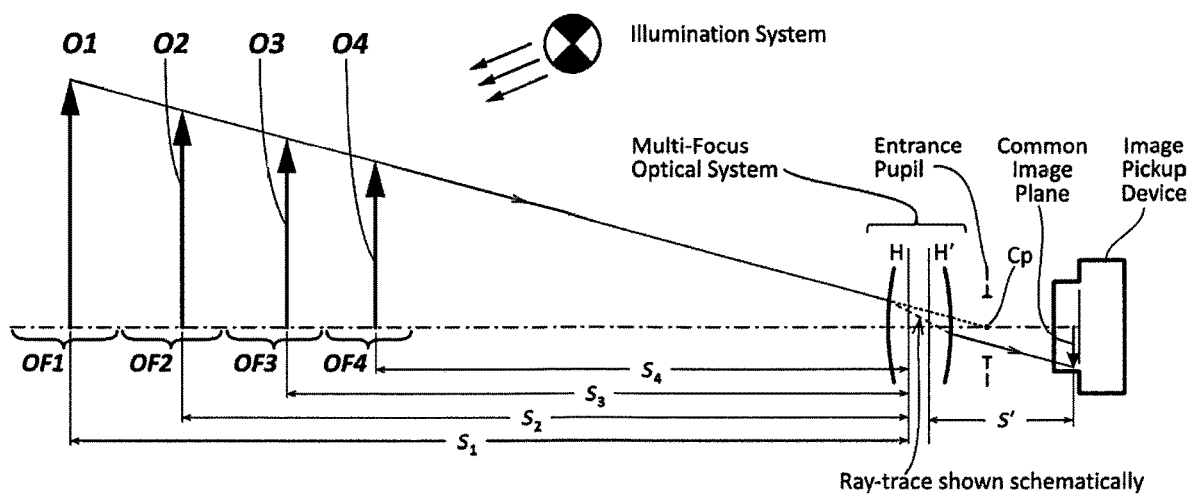
FIG. 1A shows a schematic diagram with the non-limiting embodiment of the Multi-Focus Optical System providing a Common Image for four Objects with zero parallax; ray tracing is shown schematically.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

The term "a wide field of view required in imaging applications" is used in this invention to specify the angular or linear field of view adopted in modern photography, machine vision, cinematography, inspection optical systems. As a non-limiting example, approximately 46° (±approximately) 23° diagonal angular field of view for a photographic objective of approximately 50 mm focal length intended for cameras with an electronic image sensor or a film of approximately 24 mm×approximately 36 mm size ("full frame"). Another non-limiting example: approximately 128 mm×approximately 96 mm linear field of view in object space by imaging with transverse magnification $-\frac{1}{10}^x$ (de-magnifying) using a projection objective of 50 mm focal length onto an electronic image sensor of approximately 12.8 mm×approximately 9.6 mm size of active area (approximately 1 inch sensor with approximately 4:3 aspect ratio).

The term "a broad spectral band required in imaging applications", used in this invention, means the spectrum of particular imaging applications, for which the image quality metrics such as aberration correction, contrast, sharpness is specified. As a non-limiting example, it is adopted in photography and cinematography to characterize performance of optical systems in visual spectrum (VIS) ranging approximately from approximately 0.38 µm to approximately 0.75 µm. While various industrial and scientific applications require imaging solutions with extended depth of field in ultraviolet spectrum (UV) ranging approximately from approximately 0.2 µm to approximately 0.4 µm, or near infrared spectrum (NIR) ranging approximately from approximately 0.7 µm to approximately 1 µm, or short-wave infrared spectrum (SWIR) ranging approximately from approximately 0.9 µm to approximately 2.5 µm, or mid-wave infrared spectrum (MWIR) ranging approximately from approximately 3 µm to approximately 5 µm, or long-wave infrared spectrum (LWIR) ranging approximately from approximately 8 µm to approximately 12 µm. At present, there are available various electronic image sensors for the indicated spectra, therefore the technical solutions according to the present invention can be applied to optical imaging systems operating in all of the mentioned spectral bands.

Figures and the various embodiments used to describe the principles of the present invention are by way of illustration and should not be construed in any way to limit the scope of the invention. Those skilled in the art will understand that the principles of the present invention can be implemented in a variety of imaging applications in photography, machine vision, cinematography, inspection optical systems.

The following list of numbered symbols and reference numerals is used throughout the description and drawings to identify components and specifications of the optical systems and the imaging characteristics they implement:

O1-O8 Object planes that are optically conjugate to the Common Image Plane
OF1-OF8 Object Fields-areas along the optical axis with a certain image quality, located in proximity to the respective Object planes
S1-S4 distances to the Object planes from the front principal plane of optical system
S' distance to the Common Image Plane from the back principal plane of optical system
H, H' respectively, the front and back principal planes of optical system
Cp center of the Entrance Pupil
Cd center of the Diaphragm
LG1-LG6 Lens Groups
L1-L24 separate lenses, including multi-focus lenses
M1-M5 multi-focus concentric meniscus lenses
CL cemented doublet (lens)
WGP Wire-Grid Polarizer, rotatable
WP Waveplate, rotatable According to the present invention, various optical systems for imaging in photography, machine vision, cinematography, telecentric imaging in inspection optical systems are implemented by providing an Illumination System that illuminates the object space with light of the intensity and polarization state optimal for producing images with the sharpness and contrast required in the imaging applications, applying a Multi-Focus Optical System that forms in its Common Image Plane images of multiple Objects spaced along the optical axis, and capturing the Common Image by an Image Pickup Device, the sensing plane of which is aligned with the said Common Image Plane. To meet the requirements of modern imaging applications, the Multi-Focus Optical System comprises multi-focus lenses made of birefringent materials, such as crystals or polymers with stress-induced birefringence, and provides high image quality in a wide field of view and broad spectrum due to the aplanatic and achromatic optical design at all focuses, which involves correction of spherical aberration, coma, astigmatism and chromatic aberrations; important features of the optical systems according to the present invention are the extended depth of field in object space and the pre-set parallax for Objects located at different distances along the optical axis. The pre-determined image sharpness and contrast, characterizing a certain image quality, are maintained throughout the entire extended depth of field in the object space in two basic imaging modes: either a broad Continuous Common Object Field or a combination of several Object Fields spaced apart along the optical axis for simultaneous imaging of several individual scenes. Rotating the multi-focus lenses of the Multi-Focus Optical Systems leads to switching between these basic imaging modes. The pre-set parallax results in specific visual effects in imaging applications.

Simultaneous imaging of multiple Objects in the Common Image Plane of the Multi-Focus Optical System is achieved owing to supplying its optical design with one or more multi-focus lenses made of birefringent optical materials and implemented in such a way that the optic axis of the birefringent material of each of the multi-focus lenses forms an angle with the lens optical axis ranging from approximately 10° to approximately 90°. Each lens made of birefringent material has two focuses spaced along its optical axis, and the portions of light energy delivered to these focuses are determined by the polarization state of the incoming light and the angle between the optic axis of the birefringent material and the lens optical axis; value of the said angle in the range from approximately 10° to approximately 90° is chosen in terms of the desired ratio of light intensities at specific focuses for effective extending depth of field and other requirements of a particular imaging application.

Non-limiting examples of the birefringent materials are uniaxial optical crystals such as but not limited to sapphire, calcite, crystalline quartz, yttrium orthovanadate, magnesium fluoride, lithium niobate, zinc sulfide, as well as polymers with stress-induced birefringence.

The use of one or more multi-focus lenses in an optical system provides its multifocality, while change in the reciprocal orientation of the multi-focus lenses, such as rotating one of them by a given angle, leads to a change in the number and combination of focuses of the Multi-Focus Optical System used for formation of the Common Image, as well as allows the re-distribution of light energy between specific focuses. Changing the polarization state of light, such as polarization filtering by a polarizer or rotation of the polarization plane by a waveplate, also leads to re-distribution of light energy between specific focuses, and is used to improve the contrast of the Common Image.

The present invention can be implemented using various embodiments of the Multi-Focus Optical Systems, some of the non-limiting embodiments are considered below.

FIG. 1A shows a generalized optical layout according to the present invention for imaging with the Multi-Focus Optical System that forms simultaneously in its Common Image Plane images of Objects O1, O2, O3 and O4, which are optically conjugate to the said Common Image Plane and located in the object space at different distances. Images of the pre-determined sharpness and contrast required in a particular imaging application are also formed for objects in the Object Fields OF1, OF2, OF3 and OF4 in proximity to the above said optically conjugate Object planes. The combination of these Object Fields forms the Common Object Field with extended depth in the object space.

The optical system in FIG. 1A realizes simultaneous imaging of multiple Objects with zero parallax, which means that the transverse magnification for each of the Objects obeys the laws of paraxial optics, also called Gaussian optics. As sufficiently described in the literature Smith, W. J., Modern Optical Engineering, 3rd edn., McGraw-Hill, New York, (2000), pages 21-27, incorporated by reference, for an imaging optical system the transverse magnification m, distance S to the Object from the front principal plane H, and distance S' to the Image from the back principal plane H' are linked by the equation $$m = \frac{S'}{S}. \tag{1}$$

In the case of a Multi-Focus Optical System, the distance S' is constant for all images in the Common Image Plane; therefore, according to Eq. (1), the transverse magnification m is inversely proportional to the distance S. Fulfilling this condition with the Multi-Focus Optical System in FIG. 1A ensures the imaging with zero parallax, which is preferable in applications such as optical inspection, barcode reading in machine vision systems, or the simultaneous sharp imaging of near and far objects in photography or cinematography.

Figure 1B:
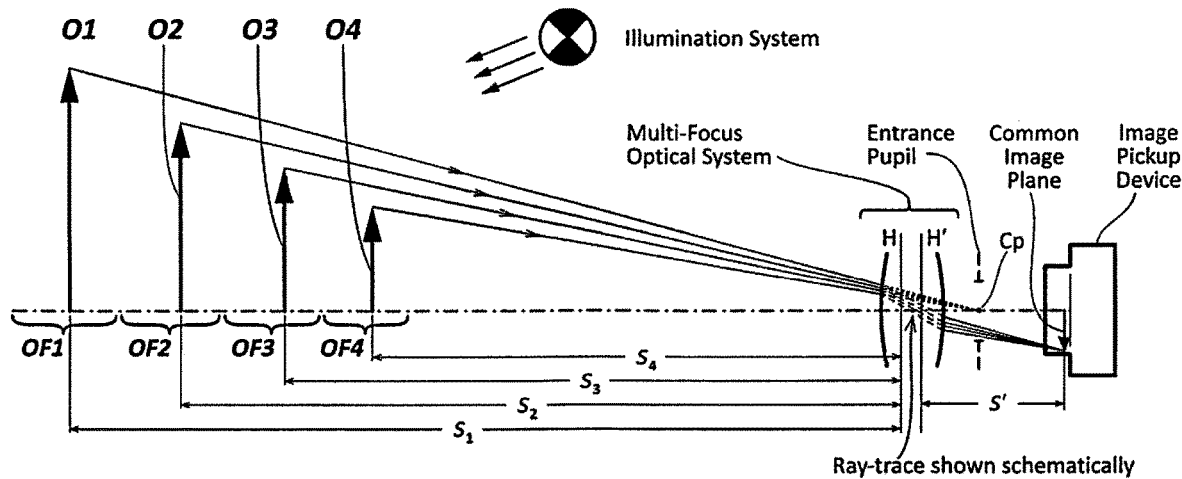
FIG. 1B and FIG. 1C show schematic diagrams with the non-limiting embodiments of the Multi-Focus Optical Systems providing in their Common Image Planes images of four Objects with parallax; ray tracing is shown schematically.
Figure 1C:
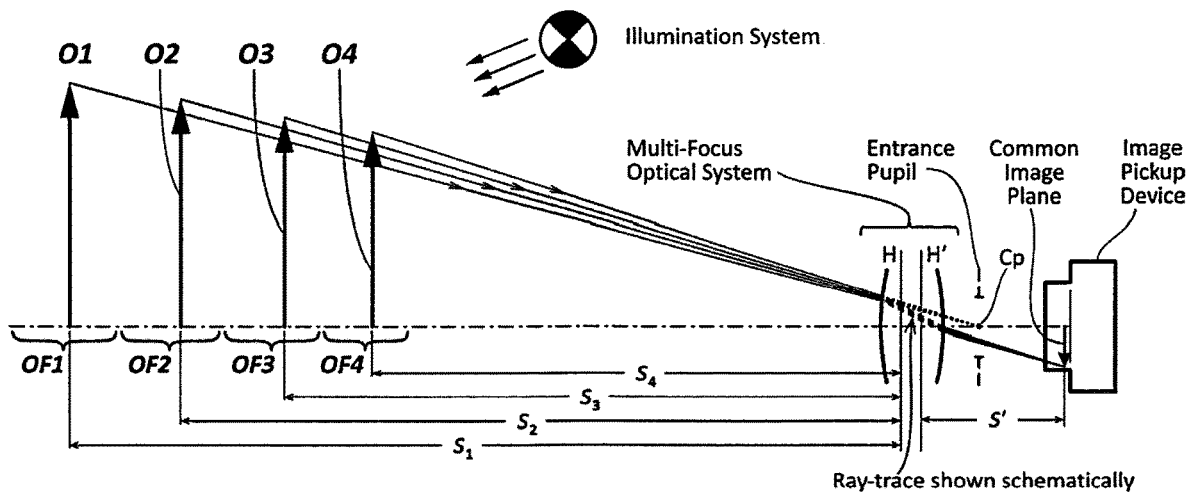

If the optical design of the Multi-Focus Optical System is implemented with distortion in such a way that the function of the transverse magnification m from the distance S deviates from the inverse proportion function according to Eq. (1), then the images of multiple Objects in the Common Image Plane will be with parallax. This effect is illustrated in FIG. 1B and FIG. 1C, which show layouts with different types of parallax. Such imaging with parallax introduces specific visual effects, for example, the effect of reciprocal movement of objects in panoramic filming with a motion-picture camera.

Images in the said Common Image Plane are captured and saved using the Image Pickup Device in the form of a photo or motion-picture camera comprising, as non-limiting examples, a film or an electronic image sensor such as a CCD (Charge-Coupled Device) or CMOS (Complementary Metal Oxide Semiconductor), the sensing planes of which are aligned with the Common Image Plane of the Multi-Focus Optical System.

Compared to other conventional solutions, an important feature of the technical solution according to the present invention is in realizing the imaging for all Object Fields using the full aperture of the optical system, without any clipping or spatial splitting of light beams. This approach ensures high image quality and equal image intensity for all Objects of individual or common Object Fields in a wide field of view and broad spectrum due to the aplanatic and achromatic optical design, which involves correction of spherical aberration, coma, astigmatism and chromatic aberrations.

Figure 2A:
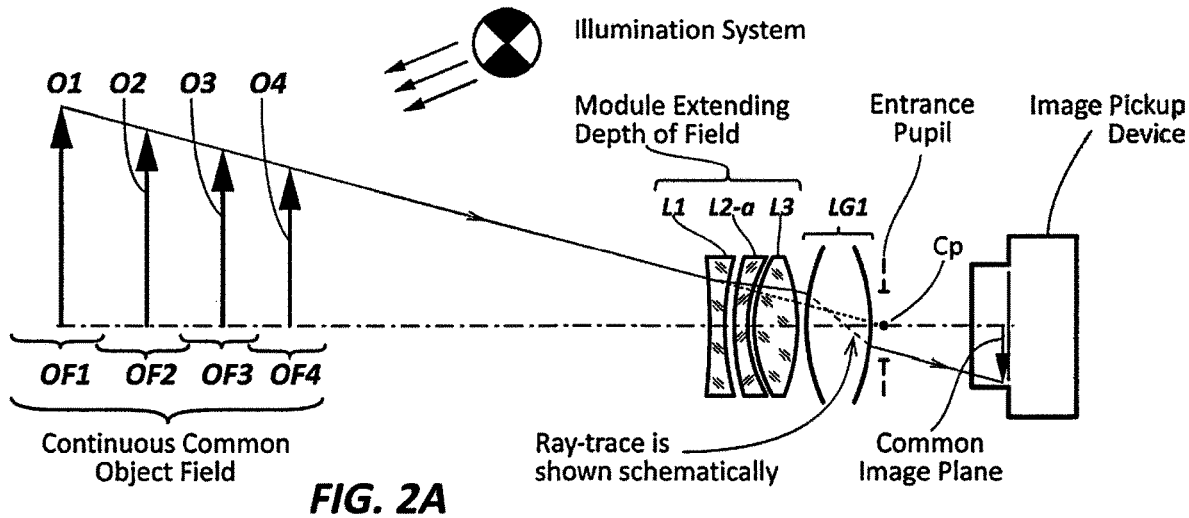
FIG. 2A, FIG. 2B and FIG. 2C show schematic diagrams for three settings of the non-limiting embodiment of the present invention with the Multi-Focus Optical System implemented in form of a conventional single-focus objective LG1 combined with a multi-focus optical Module Extending Depth of Field; a Common Image for up to four Objects with zero parallax is provided; ray tracing is shown schematically.
Figure 2B:
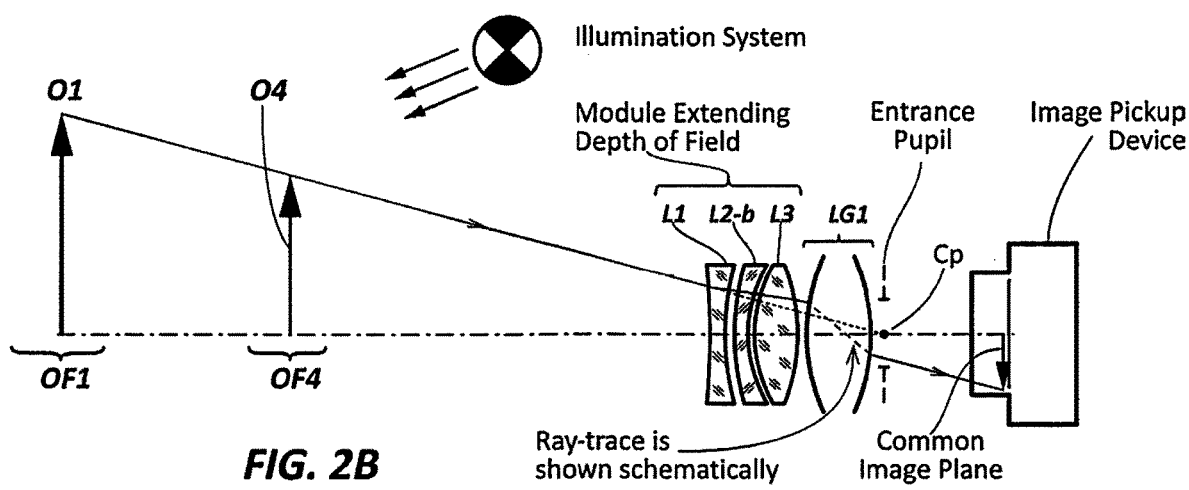
Figure 2C:
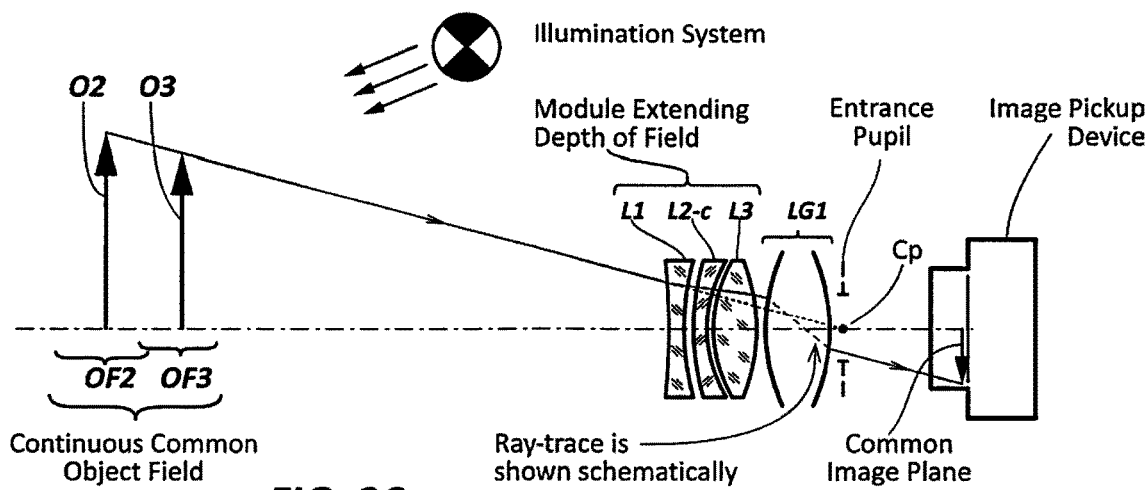

One non-limiting embodiment of the present invention is shown in FIGS. 2A, 2B and 2C as schematic diagrams with the Multi-Focus Optical System comprising a conventional single-focus objective LG1 combined with a multi-focus Module Extending Depth of Field comprising a conventional lens L1 and two multi-focus lenses L2 and L3 made of birefringent optical materials; this Multi-Focus Optical System provides in the Common Image Plane with zero parallax images of the four optically conjugate Object planes O1, O2, O3 and O4, as well as objects in the respective Object Fields OF1, OF2, OF3 and OF4; the multi-focus lens L2 is rotatable around the optical axis, and change in its setting results in changing the number and combination of the Object planes, the images of which are created in the Common Image Plane:

L2-a in FIG. 2A—all four Object planes O1, O2, O3 and O4,

L2-b in FIG. 2B—only Objects O1 and O4,

L2-c in FIG. 2C—only Objects O2 and O3;

the tracing of the principal rays is shown schematically. The Entrance Pupil of the objective LG1 is shown behind it, which is typical for photographic objectives.

Advantageously, the multi-focus Module Extending Depth of Field is afocal or close to afocal, which ensures that the Common Image Plane is located close to the initial image plane of the objective LG1. To meet the requirements of modern imaging applications, the objective LG1 itself and the multi-focus Module Extending Depth of Field applied together with the objective LG1 provide high image quality in a wide field of view and broad spectral band due to the aplanatic and achromatic optical designs involving correction of spherical aberration, coma, astigmatism and chromatic aberrations-both axial chromatism and chromatism of magnification. And the required image sharpness and contrast are maintained throughout the entire extended depth of field in the object space.

The adjacent Object Fields OF1, OF2, OF3 and OF4 in FIG. 2A overlap each other and form the broad Continuous Common Object Field; this imaging mode is important in photography, cinematography and machine vision applications when extended depth of the object field is required. A similar, though shorter, Continuous Common Object Field is shown in FIG. 2C, where the two Object Fields OF2 and OF3 are overlapping.

FIG. 2B shows another imaging mode, where images in the Common Image Plane are created for the spaced apart Object Fields OF1 and OF4. Then the simultaneously formed images of far and near located Objects are sharp and of high quality, while the images of intermediate Objects are blurred owing to defocusing. This simultaneous high-quality imaging of individual scenes spaced apart along the optical axis is a powerful tool for producing specific effects in photography and cinematography, for example improving image sharpness when filming with the "dolly zoom" effect, when images of far and near objects in the scene must be sharp simultaneously. Another example is the simultaneous visualization of the bottom and top surfaces of the workpiece when controlling with the optical machine vision system the process of drilling blind holes.

As sufficiently described in the literature Smith, W. J., Modern Optical Engineering, 3rd edn., McGraw-Hill, New York, (2000), pages 154-157, incorporated by reference, the length of the Object Field, for example OF1, or OF2, or OF3, or OF4 in FIG. 1A, is proportional to the distance S from the optical system to the Object and inversely proportional to the pupil diameter (clear aperture) of this optical system. Relative to the Object plane, for example O1 in FIG. 1A, which is optically conjugate to the Common Image Plane of the Multi-Focus Optical System, the portion of the Object Field located away from the optical system is larger than the respective portion toward the optical system. In photography, cinematography and machine vision, it is adopted to characterize pupil size by the F-number (F/ #, or relative aperture)—the ratio of the focal length of the optical system to the diameter of the entrance pupil. As a result, the length of the Object Field is proportional to the F-number. Obviously, changing the F-number of the Multi-Focus Optical System does not change the position of the Object planes, but it does change in the length of the Object Fields, which allows the internal structure of the Common Object Field to be changed, for example, placing the Objects Fields next to each other, as shown in FIG. 1A, or overlapping them, as shown in FIG. 2A.

Variation of distances between Object planes can be achieved by changing the focal length of the Multi-Focus Optical System. According to one non-limiting embodiment of the present invention, the single-focus objective LG1 in FIG. 2A is implemented as a zoom objective with variable focal length. Then, changing the focal length and F-number of the objective LG1 results in changes in lengths of the Object Fields OF1, OF2, OF3 and OF4 and the distances between them,—this allows changing in the structure of the Common Object Field and its optimizing to requirements of a particular imaging application.

Figure 3A:
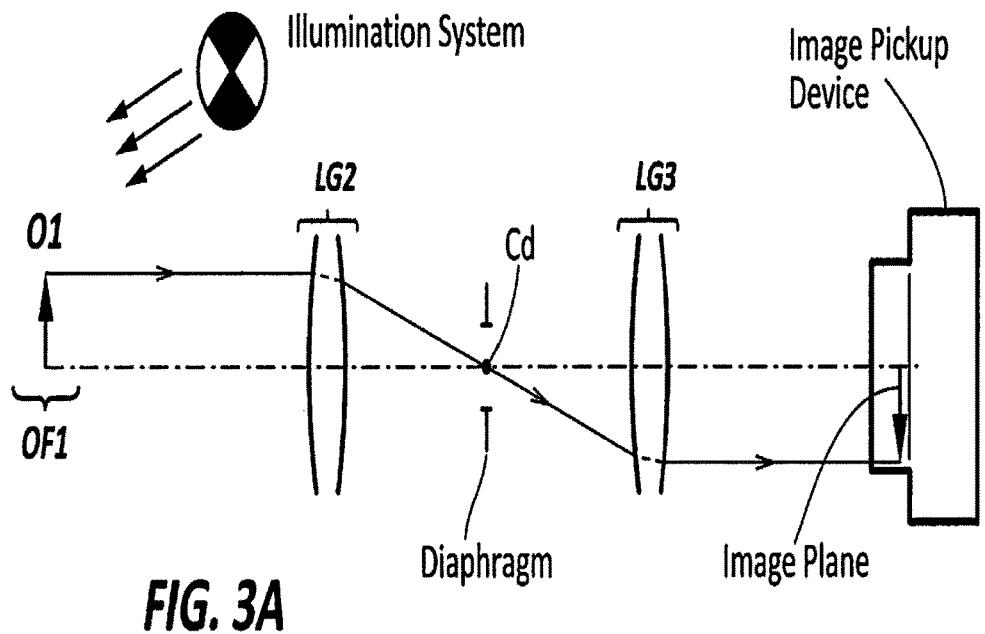
FIG. 3A and FIG. 3B show schematic diagrams with telecentric projection objectives with telecentricity simultaneously in object space and in image space.
Figure 3B:
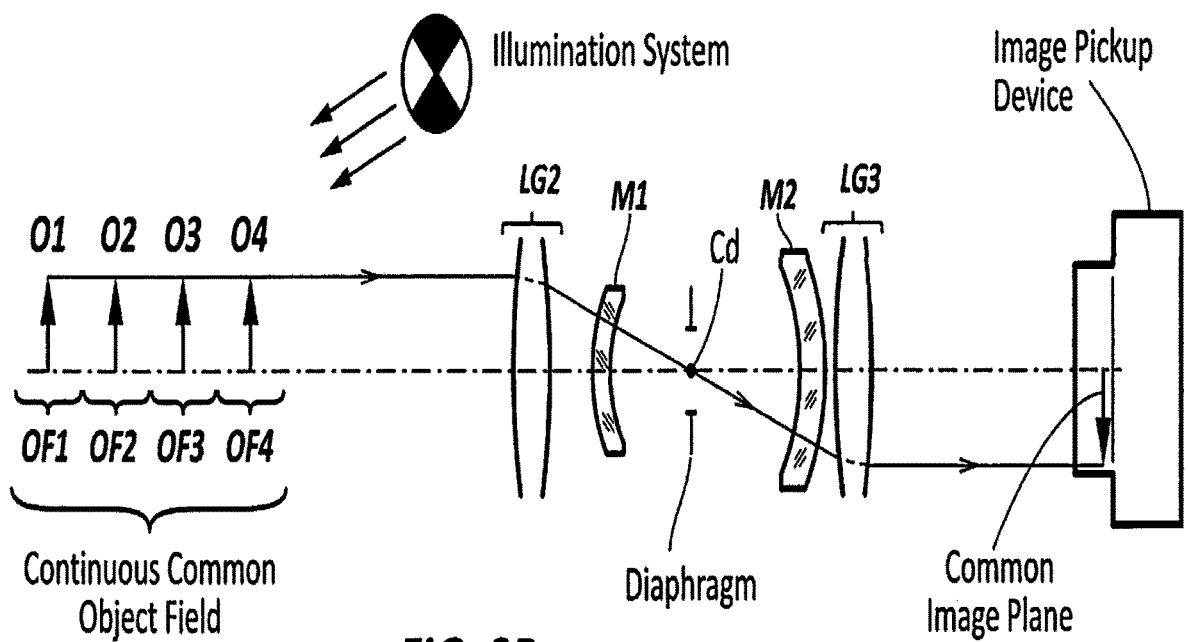

The present invention may be applied in telecentric inspection systems. Telecentric optical systems (projection objectives) with telecentricity in both object space and image space are shown in FIG. 3A and FIG. 3B. Telecentricity is provided by the coincidence of the center Cd of the system Diaphragm and the focuses of the lens groups LG2 and LG3, which have positive optical powers and comprise one or more optical lenses, thus the telecentric projection optical system represents a Keplerian telescope providing a real Image of the Object in the Image Plane of the Image Pickup Device, for example, the real Image of the Object O1 in FIG. 3A. Then the principal rays of the light beams are parallel to the optical axis both in the object space and in the image space, i.e., before the optical system and after it. This ensures not only a constant transverse magnification, but also zero image parallax and, therefore, the dimensions invariability in the Image Plane even when the Objects are displaced along the optical axis; FIG. 3A and FIG. 3B show schematic ray tracing for one of principal rays. This invariability of dimensions in the Image Plane is important and is widely used in many machine vision and microscopy applications for measurement and inspection purposes. One of the most important characteristics of telecentric projection imaging systems is the depth of field, extending of which significantly enhance the optics performance in the practice of industrial measurements and inspection.

A non-limiting embodiment according to the present invention in the form of a telecentric Multi-Focus Optical System is shown in FIG. 3B; it represents an evolution of the telecentric optical system in FIG. 3A with following features:

the optical system is supplied with two multi-focus concentric meniscus lenses M1 and M2 made of birefringent materials and designed so that the optic axis of the birefringent material of each of the multi-focus meniscus lenses forms an angle with its optical axis in the range from approximately 10° to approximately 90°, the meniscus lens M1 is located between the lens group LG2 and the Diaphragm, the meniscus lens M2 is located between the Diaphragm and the lens group LG3, centers of curvature of the spherical surfaces of the concentric meniscus lenses M1 and M2 coincide with the center Cd of the Diaphragm, images of multiple objects in the Object Fields OF1, OF2, OF3 and OF4 are formed in the Common Image Plane that is optically conjugate to the Objects O1, O2, O3 and O4 and coincides with the sensing plane of the Image Pickup Device, the Object Fields OF1, OF2, OF3 and OF4 form the Continuous Common Object Field, thus extending the depth of field in the object space.

A concentric meniscus lens is inherently a negative lens, regardless of the optical material it is made from. Therefore, supplying the telecentric optical system with the meniscus lenses M1 and M2, while maintaining a constant distance between the lens group LG3 and the Image Pickup Device, FIG. 3A and FIG. 3B, results in a displacement of the Object O1 away from the optical system, so the distance from the lens group LG2 to the Object O1 in FIG. 3B is increased compared to the respective distance in the system shown in FIG. 3A.

The concentricity of the spherical surfaces of the meniscus lenses M1 and M2 and the coincidence of their centers of curvature with the center Cd of the Diaphragm ensures the invariability of the geometrical path of the principal rays of beams regardless of the refractive index of the menisci materials. Due to implementing the optical design as a Keplerian telescope, this optical system provides imaging with zero parallax. And due to telecentricity in the object space, the constant transverse magnification is provided for Objects optically conjugate to the Common Image Plane and located at different distances. Therefore, the extension of the depth of field is achieved without any change in the geometric dimensions of the images for the Objects of the Common Object Field. This ensures the accuracy of the measurement and inspection techniques performed with the considered telecentric imaging optical systems, even in case of displacement of the Objects or the Image Pickup Device along the optical axis.

As a non-limiting modification of the considered embodiment of the present invention, only one of the meniscus lenses M1 or M2 may be installed in the telecentric optical system. Then images of multiple objects located in the two of the Object Fields shown in FIG. 3B are formed in the Common Image Plane, therefore the length of the Common Object Field is reduced.

According to another non-limiting modification of the considered embodiment of the present invention, more than two multi-focus concentric meniscus lenses may be installed in the telecentric optical system in such a way that their centers of curvature of the spherical surfaces coincide with the center Cd of the Diaphragm. Then the maximal number of Object Fields and Objects optically conjugate to the Common Image Plane is $2^N$, where N is the number of multi-focus meniscus lenses. Increasing the number of multi-focus concentric meniscus lenses leads to increasing the length of the Common Object Field, i.e., further extending the depth of field in the object space.

Figure 4:
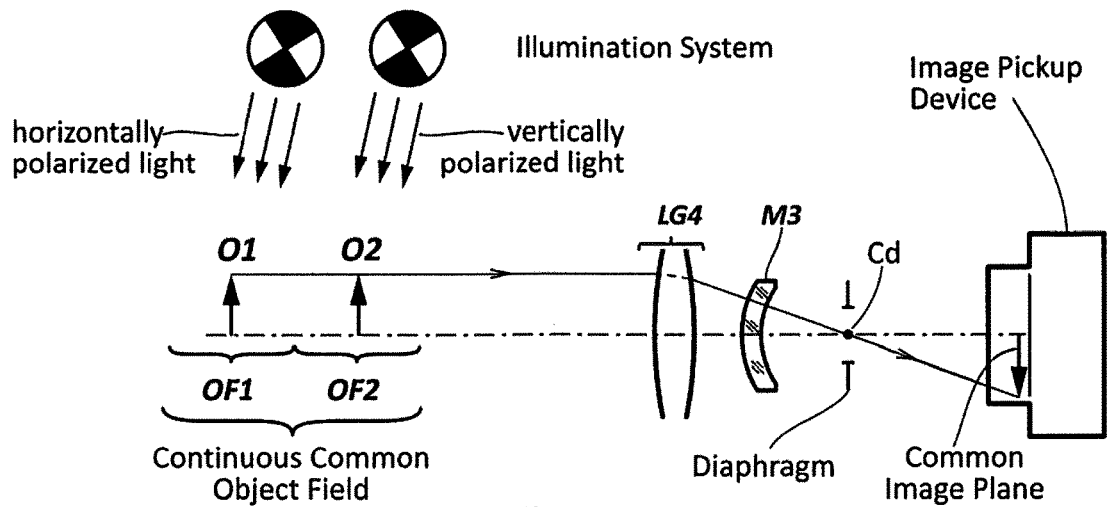
FIG. 4 shows a schematic diagram of another non-limiting embodiment of the present invention with the Multi-Focus Optical System implemented in form of a telecentric projection objective with telecentricity in object space, comprising a lens group and one multi-focus concentric meniscus lens; the Common Image for two Objects with zero parallax is provided; these Objects are separately illuminated by different sources of vertically and horizontally polarized light.

FIG. 4 shows one more non-limiting embodiment of the present invention, in which the Multi-Focus Optical Systems is implemented in the form of a telecentric optical system (projection objective) with telecentricity in the object space, this technical solution can be considered as an evolution of the previously described embodiment shown in FIG. 3B by using the input part of the optical system till the Diaphragm:

- the lens group LG4 is an objective with positive optical power comprising one or more optical lenses,
- the center Cd of the system Diaphragm coincides with the back focus of the lens group LG4, therefore the telecentricity in the object space is provided: principal rays of the light beams are parallel to the optical axis in the object space; schematic ray trace for one of the principal rays is shown,
- the optical system comprises the multi-focus concentric meniscus lens M3 made of birefringent material and designed so that the optic axis of the birefringent material forms an angle with its optical axis in the range from approximately 10° to approximately 90°,
- the meniscus lens M3 is located between the lens group LG4 and the Diaphragm,
- centers of curvature of the spherical surfaces of the concentric meniscus lens M3 coincide with the center Cd of the Diaphragm,
- images of multiple objects in the Object Fields OF1 and OF2 are formed in the Common Image Plane that is optically conjugate to the Objects O1 and O2 and coincides with the sensing plane of the Image Pickup Device,
- the Object Fields OF1 and OF2 form the Continuous Common Object Field, thus extending the depth of field in the object space,
- the said Object Fields OF1 and OF2 are separately illuminated by two separate sources of polarized light with orthogonal polarization directions: horizontal for OF1 and vertical for OF2.

Due to the telecentricity in the object space, this optical system provides imaging with zero parallax and a constant transverse magnification for Objects optically conjugate to the Common Image Plane and located at different distances. This ensures that the geometric dimensions of the Object images in the Common Image Plane remain unchanged even when the Objects are displaced along the optical axis.

The separate illumination of the Object Fields by polarized light with orthogonal polarization directions makes it possible to improve the imaging quality in the Common Image Plane. For each object in the Common Object Field, the Multi-Focus Optical System forms several polarized images spaced along the optical system: one of these images is in the Common Image Plane, while the others are defocused and unsharp, which reduces the contrast of the Common Image captured by the Image Pickup Device. The separate illumination of the separate objects with polarized light with orthogonal polarization directions leads to suppression of intensity of the defocused images formed outside the Common Image Plane, and results in increasing the contrast of the Common Image.

According to the present invention, the effect of suppressing the intensity of the defocused images is further enhanced by the use of the Image Pickup Device with an electronic image sensor implemented in such a way that its different pixels preferentially pick up light polarized along predetermined directions. An example implementation of such a sensor with polarization-sensitive pixels is described in U.S. Pat. No. 11,108,951 to Kurita, et al., incorporated by reference, in its' entirety. Nowadays, such sensors and polarization imaging cameras are available from several manufacturers. Separate capture of polarized images from different Objects in the Common Image Plane makes it possible to enhance the contrast of this Common Image.

According to a non-limiting modification of the considered embodiment of the present invention, two and more multi-focus concentric meniscus lenses may be installed in the telecentric optical system in such a way that their centers of curvature of the spherical surfaces coincide with the center Cd of the Diaphragm. Then the maximal number of Object Fields and Objects optically conjugate to the Common Image Plane is $2^N$, where N is the number of multi-focus meniscus lenses. Increasing the number of multi-focus concentric meniscus lenses leads to increasing the length of the Common Object Field, i.e., further extending the depth of field in the object space.

Figure 5:
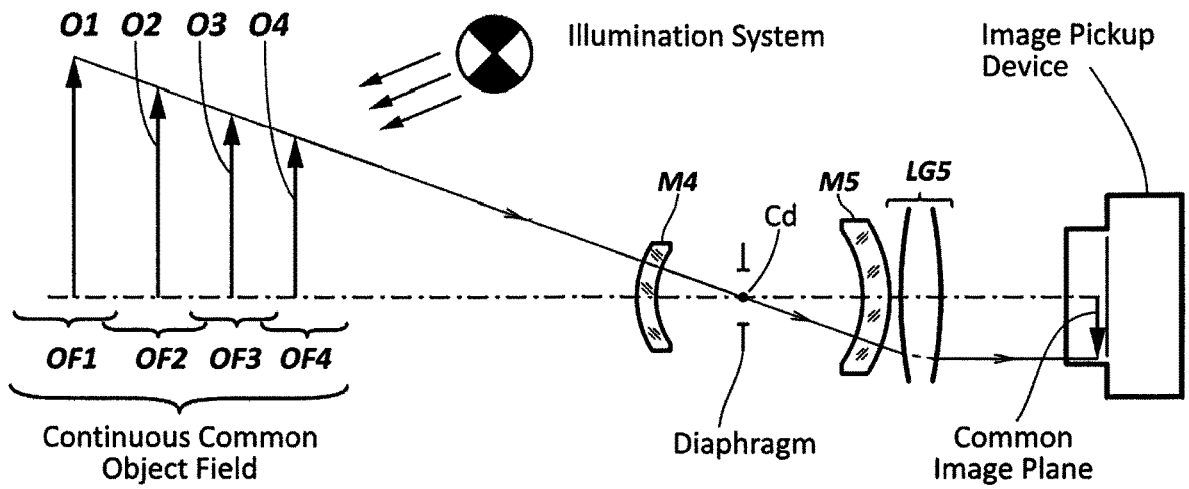
FIG. 5 shows a schematic diagram of one more non-limiting embodiment of the present invention with the Multi-Focus Optical System implemented in form of a telecentric projection objective with telecentricity in image space, comprising a lens group and two multi-focus concentric meniscus lenses; the Common Image for four Objects with zero parallax is provided.

FIG. 5 shows one more non-limiting embodiment of the present invention, where the Multi-Focus Optical Systems is implemented as a telecentric optical system (projection objective) with telecentricity in the image space, this technical solution can be considered as an evolution of the previously described embodiment shown in FIG. 3B, excluding the input lens group:

- the lens group LG5 is an objective with positive optical power comprising one or more optical lenses,
- the center Cd of the system Diaphragm coincides with the front focus of the lens group LG5, therefore the telecentricity in the image space is provided: principal rays of the light beams are parallel to the optical axis in the image space after the lens group LG5; schematic ray trace for one of the principal rays is shown,
- the optical system comprises two multi-focus concentric meniscus lenses M4 and M5 made of birefringent materials and designed so that the optic axis of the birefringent material of each of the multi-focus meniscus lenses forms an angle with its optical axis in the range from approximately 10° to approximately 90°,
- the multi-focus lenses M4 and M5 are located before the lens group LG5,
- centers of curvature of the spherical surfaces of the concentric meniscus lenses M4 and M5 coincide with the center Cd of the Diaphragm,
- images of multiple objects in the Object Fields OF1, OF2, OF3 and OF4 are formed in the Common Image Plane that is optically conjugate to the Objects O1, O2, O3 and O4 and coincides with the sensing plane of the Image Pickup Device,
- the Object Fields OF1, OF2, OF3 and OF4 overlap each other and form the Continuous Common Object Field, thus extending the depth of field in the object space.

Due to telecentricity in image space, this optical system provides imaging with zero parallax, so the transverse magnification for Objects located at different distances obeys the law of paraxial optics according to Eq. (1). Imaging with telecentricity in the image space ensures that the dimensions remain constant in the Common Image Plane even when the Image Pickup Device is displaced along the optical axis; this feature is useful in measurement and inspection applications, where the distance to the Image Pickup Device may vary.

As a non-limiting modification of the considered embodiment of the present invention, only one of the meniscus lenses M4 or M5 may be installed in the telecentric optical system. Then images of multiple objects located in the two of the Object Fields shown in FIG. 5 are formed in the Common Image Plane.

According to another non-limiting modification of the considered embodiment of the present invention, more than two multi-focus concentric meniscus lenses may be installed in the telecentric optical system in such a way that their centers of curvature of the spherical surfaces coincide with the center Cd of the Diaphragm. Then the maximal number of Object Fields and Objects optically conjugate to the Common Image Plane is $2^N$, where N is the number of multi-focus meniscus lenses. Increasing the number of multi-focus concentric meniscus lenses leads to increasing the length of the Common Object Field, i.e., further extending the depth of field in the object space.

Figure 6A:
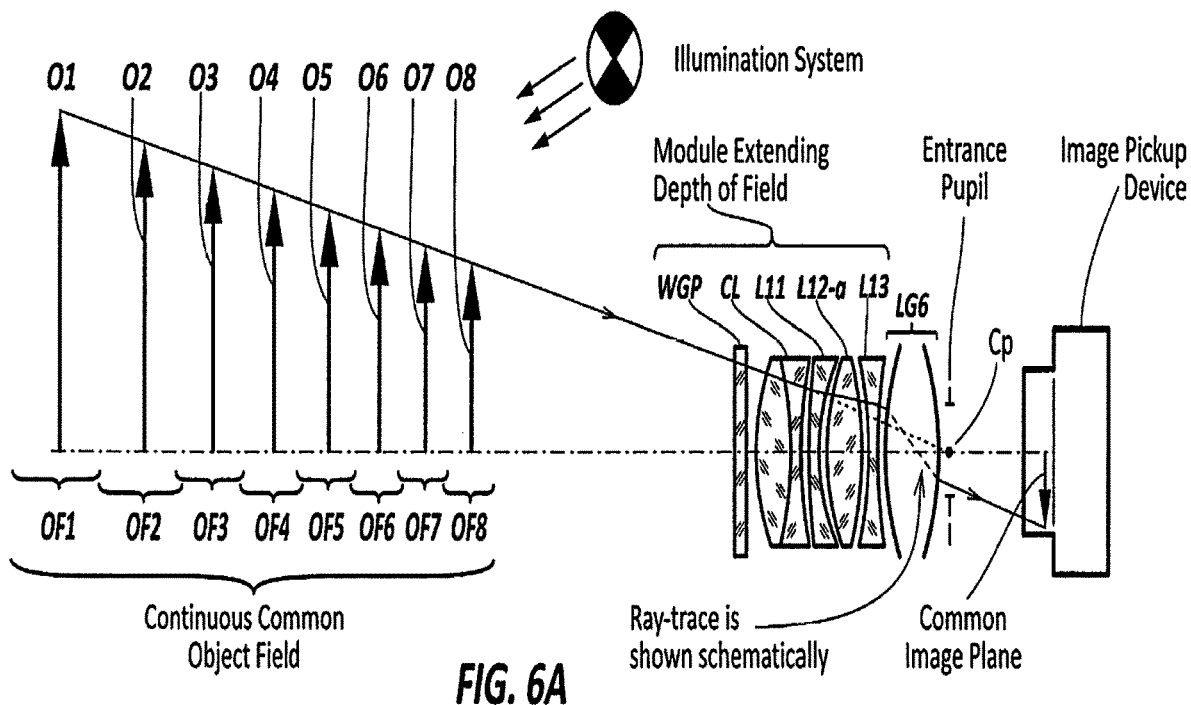
FIG. 6A and FIG. 6B show schematic diagrams for two settings of one more non-limiting embodiment of the present invention with the Multi-Focus Optical System implemented in form of a conventional single-focus objective LG6 combined with a multi-focus optical Module Extending Depth of Field and a rotatable Wire-Grid Polarizer; a Common Image for up to eight Objects with zero parallax is provided; ray tracing is shown schematically.
Figure 6B:
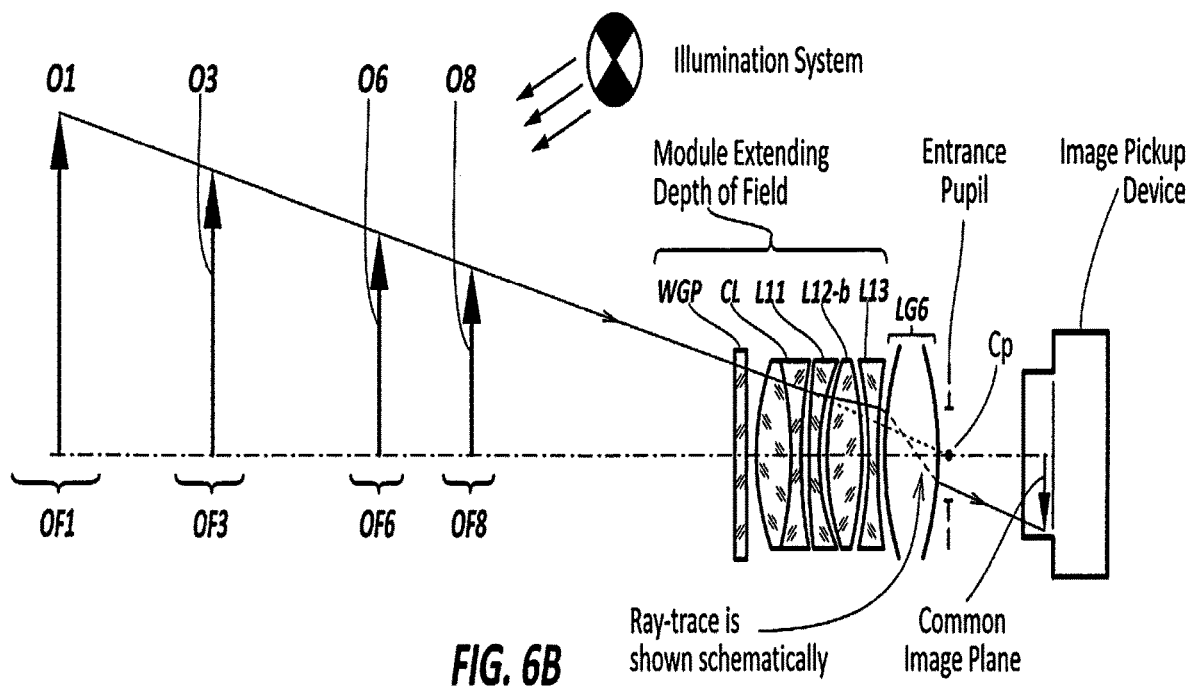

A further extension of the depth of field is achieved by increasing the number of multi-focus lenses in the optical design of the Multi-Focus Optical Systems, this approach is presented in FIGS. 6A and 6B, where a schematic diagram of one more non-limiting embodiment of the present invention is shown, which can be considered as an evolution of the previously described embodiment shown in FIG. 2A:

the Multi-Focus Optical System with aplanatic and achromatic optical design is composed from a conventional single-focus objective LG6 and a multi-focus optical Module Extending Depth of Field, the lens group LG6 is an objective, or a zoom objective, with positive optical power comprising one or more optical lenses, the said Module Extending Depth of Field presents a multi-lens optical system and comprises three multi-focus lenses L11, L12 and L13 made of birefringent optical materials and designed so that the optic axis of the birefringent material of each of the multi-focus lenses forms an angle with its optical axis in the range from approximately 10° to approximately 90°, this Multi-Focus Optical System provides imaging with zero parallax for eight Object planes O1 to O8, optically conjugate to the Common Image Plane, as well as for objects located in the respective Object Fields OF1 to OF8, two of the multi-focus lenses are rotatable, and changing their settings results in changing the combination and number of Object planes, the images of which are formed in the Common Image Plane, for example, eight Objects in FIG. 6A and four Objects in FIG. 6B, a cemented doublet CL of the Module Extending Depth of Field is used to provide the aplanatic and achromatic optical design at all focuses, to ensure high quality imaging in a wide field of view and broad spectral band, the Multi-Focus Optical System is supplied with a rotatable Wire-Grid Polarizer WGP installed in front of the Module Extending Depth of Field, ray tracing is shown schematically, as is typical of photographic objectives, the Entrance Pupil of the optical system is located behind the objective LG6.

Advantageously, the multi-focus Module Extending Depth of Field is afocal or close to afocal, which ensures that the Common Image Plane is located close to the initial image plane of the objective LG6. To meet the requirements of modern imaging applications, the objective LG6 itself and the multi-focus Module Extending Depth of Field applied together with the objective LG6 provide high image quality in a wide field of view and broad spectral band due to the aplanatic and achromatic optical designs involving correction of spherical aberration, coma, astigmatism and chromatic aberrations-both axial chromatism and chromatism of magnification. And the required image sharpness and contrast are maintained throughout the entire extended depth of field in the object space.

As a non-limiting implementation of the considered embodiment, the multi-focus lenses L11 and L12 are rotatable around the optical axis, in particular, changing the setting of the lens L12 results in the following combinations and numbers of the Object planes, the images of which are formed in the Common Image Plane:

L12-a in FIG. 6A—all eight Object planes O1 to O8; when the adjacent corresponding Object Fields OF1 to OF8 overlap each other, the broad Continuous Common Object Field is formed; this imaging mode is important in photography, cinematography and machine vision applications when extended depth of the object field is required, L12-b in FIG. 6B—four Object planes O1, O3, O6 and O8; obviously, the corresponding Object Fields OF1, OF3, OF6 and OF8 are spaced apart, thus realizing a simultaneous high quality imaging of several individual scenes separated along the optical axis; this imaging mode is important for specific visual effects in photography and cinematography.

According to another non-limiting modification of the considered embodiment of the present invention, the Module Extending Depth of Field comprises three and more multi-focus lenses, and then the maximal number of Object Fields and Objects optically conjugate to the Common Image Plane is $2^N$, where N is the number of the multi-focus lenses. Increasing the number of multi-focus lenses leads to increasing the length of the Common Object Field, i.e., further extending the depth of field in the object space.

The rotatable Wire-Grid Polarizer WGP in front of the Module Extending Depth of Field is a kind of polarizer and is intended to optimize the polarization state of the input light in order to increase image sharpness and contrast in the Common Image Plane. The Multi-Focus Optical System according to the present invention provides polarization splitting of light in such a way that the images in the Common Image Plane for the multiple Objects, which are optically conjugate to this Common Image Plane, are linearly polarized, and the polarization directions of the images of the adjacent Objects are orthogonal to each other. As a polarizer, the WGP only transmits light of a certain polarization, therefore its rotation results in changes in the intensity of sharp images formed in the Common Image Plane and defocused blurred images outside this plane; this effect is a powerful tool for optimizing the contrast of the Common Image captured by the Image Pickup Device. Along with WGP, polarizers of other types can also be applied. As a non-limiting example, FIGS. 6A and 6B show the WGP polarizer as the first optical element of the Multi-Focus Optical System, however according to the present invention the WGP can also be placed inside and after the said system. A further increase in image contrast in the Common Image Plane can be achieved using the technical solutions described above for the embodiment of the present invention shown in FIG. 4: separate illumination of the Objects with polarized light with orthogonal polarization directions for the adjacent Objects and the use of the Image Pickup Device comprising the sensors with polarization-sensitive pixels.

Figure 7:
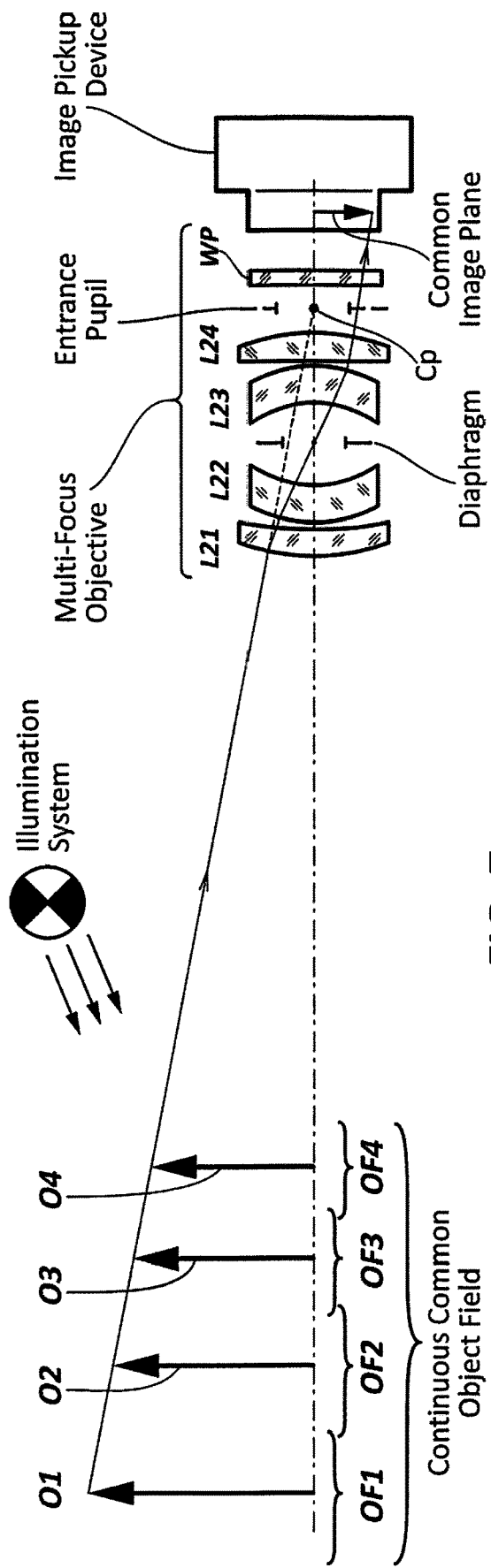
FIG. 7 shows a schematic diagram of one more non-limiting embodiment of the present invention with the Multi-Focus Optical System implemented in form of a four-lens objective comprising two multi-focus lenses and a rotatable Waveplate; one of the multi-focus lenses is rotatable; the Common Image for four Objects with zero parallax is provided.

According to one more non-limiting embodiment of the present invention, a schematic diagram of which is shown in FIG. 7, the Multi-Focus Optical System presents a Multi-Focus Objective comprising conventional lenses and multi-focus lenses, as well as a rotatable Waveplate:

aplanatic and achromatic optical design provides high quality imaging in a wide field of view and broad spectral band with zero parallax for four Object planes O1, O2, O3 and O4, optically conjugate to the Common Image Plane, as well as for objects located in the corresponding Object Fields OF1, OF2, OF3 and OF4, lenses L21 and L24 are conventional lenses manufactured using state-of-the-art technologies, lenses L22 and L23 are multi-focus lenses made of birefringent optical materials and designed so that the optic axis of the birefringent material of each of the multi-focus lenses forms an angle with its optical axis in the range from approximately 10° to approximately 90°, one of the multi-focus lenses is rotatable, the rotatable waveplate WP is the last optical element of the optical system, ray tracing is shown schematically, as is typical of photographic objectives, the Entrance Pupil of the optical system is located behind the objective.

As a non-limiting implementation of the considered embodiment, the multi-focus lens L23 is rotatable around the optical axis, in particular, changing the setting of this lens results in changing in combinations and numbers of the Object planes, the images of which are formed in the Common Image Plane, similar to the rotation of the lens L2 in the above considered embodiment shown in FIGS. 2A, 2B and 2C.

According to another non-limiting modification of the considered embodiment of the present invention, the Multi-Focus Objective comprises two and more multi-focus lenses, and then the maximal number of Object Fields and Objects optically conjugate to the Common Object Plane is $2^N$, where N is the number of the multi-focus lenses. Increasing the number of multi-focus lenses leads to increasing the length of the Common Object Field, i.e., further extending the depth of field in the object space.

The considered embodiment of the present invention may be further modified by implementing the Multi-Focus Objective as a zoom objective with variable focal length. Then, concurrent changing the focal length and F-number of the Multi-Focus Objective results in changes in lengths of the Object Fields OF1, OF2, OF3 and OF4 and the distances between them, this allows changing in the structure of the Common Object Field and its optimizing to requirements of a particular imaging application.

One more modification of the considered embodiment of the present invention is the use of more than two conventional lenses manufactured using the state-of-the-art technologies. This allows improving correction of spherical aberration, coma, astigmatism and chromatic aberrations and providing an aplanatic and achromatic optical design with enhanced characteristics of the Multi-Focus Optical System required in modern imaging applications, for example a wider field of view and a larger Entrance Pupil.

As a non-limiting implementation of the considered embodiment, the rotatable Waveplate WP is a multi-order or a zero-order or an achromatic half-wave plate optimized for operation within the spectral band of a particular imaging application. According to another non-limiting implementation of the considered embodiment, the rotatable Waveplate WP is a multi-order or a zero-order or an achromatic quarter-wave plate optimized for operation within the spectral band of a particular imaging application. The rotation of the WP results in a lossless change in the polarization state of the light forming images in the Common Image Plane, and allows optimizing the sharpness and contrast of the Common Image. Owing to the above described polarization splitting of light provided by the Multi-Focus Optical System according to the present invention, the change in the polarization state of the light forming images results in a change in intensity of the high contrast images formed in the Common Image Plane and the defocused blurred images outside this plane. This effect is a powerful tool for optimizing the contrast of the Common Image captured by the Image Pickup Device.

As a non-limiting example, the Waveplate WP shown in FIG. 7 is the last optical element of the Multi-Focus Objective, however according to the present invention the WP may also be placed inside or in front of this objective. A further increase in image contrast in the Common Image Plane can be achieved using the technical solutions described above for the embodiment of the present invention shown in FIG. 4: separate illumination of the Objects with polarized light with orthogonal polarization directions for the adjacent Objects and the use of the Image Pickup Device comprising the sensors with polarization-sensitive pixels.

Multi-Focus Optical Systems of all embodiments of the present invention considered in this detailed description may comprise either the rotatable Wire-Grid Polarizer WGP or the rotatable Waveplate WP to optimize the contrast of the Common Image captured by the Image Pickup Device.

Figure 8A:
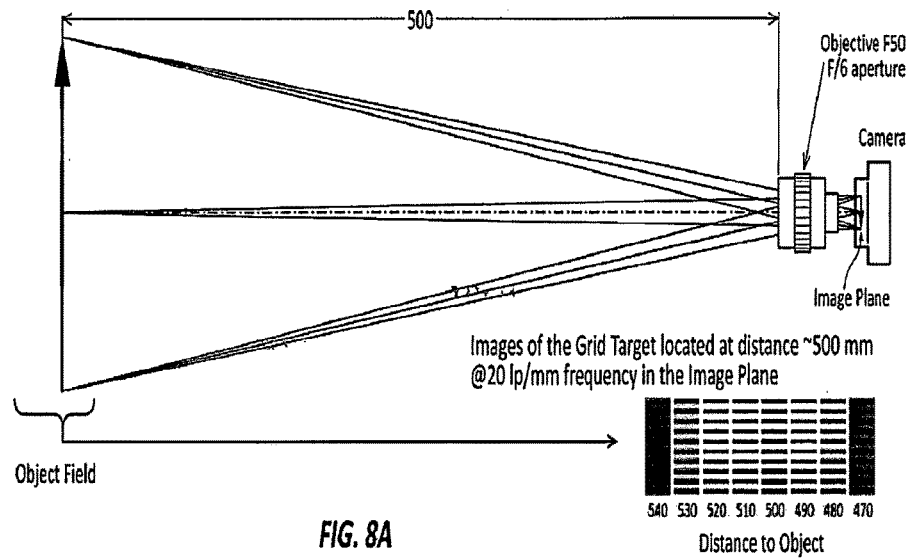
FIG. 8A shows an image formation diagram for a Grid Target using a conventional single-focus Objective with approximately 50 mm focal length; at approximately 500 mm distance to Objects, the acceptable imaging quality is provided for the Object Field of approximately 50 mm length.
Figure 8B:
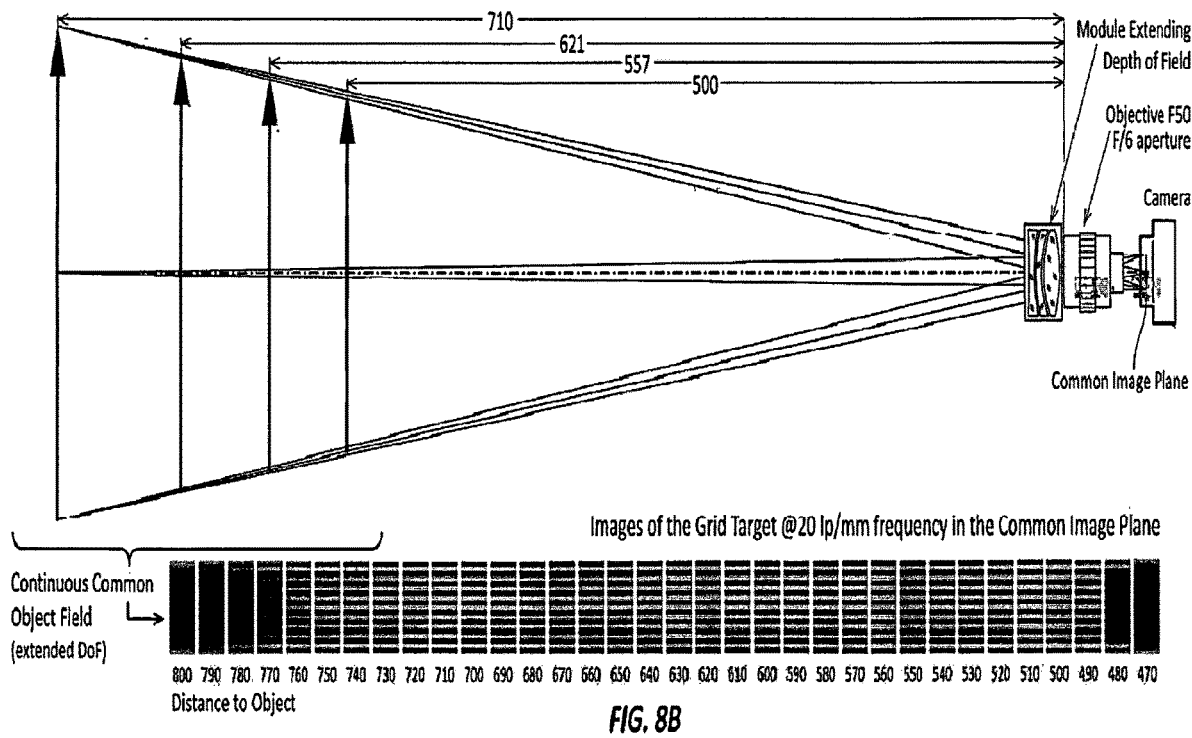
FIG. 8B shows an image formation diagram for a Grid Target using the non-limiting embodiment of the present invention, shown in FIG. 2A: combination of the conventional single-focus Objective with 50 mm focal length and the attached Module Extending Depth of Field; the acceptable imaging quality is provided for the Continuous Common Object Field of 250 mm length.

The effect of extending the depth of field is illustrated in FIGS. 8A and 8B, which show a comparison of the performance specifications when imaging with a conventional single-focus objective and a Multi-Focus Optical System implemented according to the embodiment shown in FIG. 2A:

FIG. 8A shows the schematic diagram of imaging using a single-focus Objective with focal length approximately 50 mm and F/6 aperture when the Object is located at distance approximately 500 mm; the Image is captured by the camera, FIG. 8B shows the schematic diagram of imaging using a Multi-Focus Optical System composed from the same single-focus Objective as in FIG. 8A and a Module Extending Depth of Field, providing in the Common Image Plane images of four optically conjugate Objects located at distances of approximately 500 mm, approximately 557 mm, approximately 621 mm and approximately 710 mm, with zero parallax; the Common Image is captured by the camera, the Object Fields corresponding to the said four Objects overlap each other and form a Continuous Common Object Field, FIGS. 8A and 8B include results of simulation of the considered optical systems using optical design software, in particular, the Grid Target images at spatial frequency of approximately 20 lp/mm (line pairs per millimeter) in the Image Plane in FIG. 8A, and in the Common Image Plane in FIG. 8B, with the single-focus imaging, FIG. 8A, acceptable imaging quality is provided in the object field of approximately 50 mm length, with the imaging using the Multi-Focus Optical System, FIG. 8B, acceptable imaging quality is provided in the Continuous Common Object Field of approximately 250 mm length.

The comparison of the Grid Target images shows that when imaging with the Multi-Focus Optical System the image contrast is slightly reduced throughout the entire Continuous Common Object Field, which is, indeed, acceptable in real photography and machine vision practice, since the image contrast can be improved using modern image processing software.

The length of the Continuous Common Object Field in FIG. 8B, where the Grid Target image is characterized by acceptable contrast and sharpness, is approximately 250 mm, which is about 5 times larger than the length of the Object Field in the case of imaging with the conventional single-focus Objective,—approximately 50 mm in FIG. 8A. Obviously, the use of the Multi-Focus Optical System according to the present invention makes it possible to realize imaging with significant extension of the depth of field in the object space.

The operation of the optical systems according to the present invention is demonstrated in FIGS. 9A, 9B, 9C and 9D, which show experimental photographs obtained by imaging four separate Objects in form of black and white Grid Targets located at different distances of approximately 500 mm, approximately 557 mm, approximately 621 mm and approximately 710 mm using two types of optical systems: a conventional objective as shown in FIG. 8A, and a Multi-Focus Optical System implemented according to FIG. 2A and providing the Continuous Common Object Field, as shown in FIG. 8B.

In the case of image acquisition with the conventional objective, a sharp image is formed for only one of the Grid Targets, such as Object Nr.1 as shown in FIG. 9B, or Object Nr.4 as shown in FIG. 9C, while the images of the other Grid Targets are blurred.

In the case of image acquisition using the optical system providing the Continuous Common Object Field, images with acceptable contrast of all four Objects (Grid Targets) are formed simultaneously in the Common Image Plane, FIG. 9D. As expected by imaging using a Multi-Focus Optical System providing extension of depth of field, the image contrast is lower than that by imaging using a conventional optics. However, the image contrast can be significantly improved using modern image processing software in applications such as reading barcodes or 2D QR-codes (quick response codes), which present black and white patterns. Thus, the optical task of a significant, up to approximately 5 times, extension of the imaging depth of field is successfully solved.

Figure 10A:
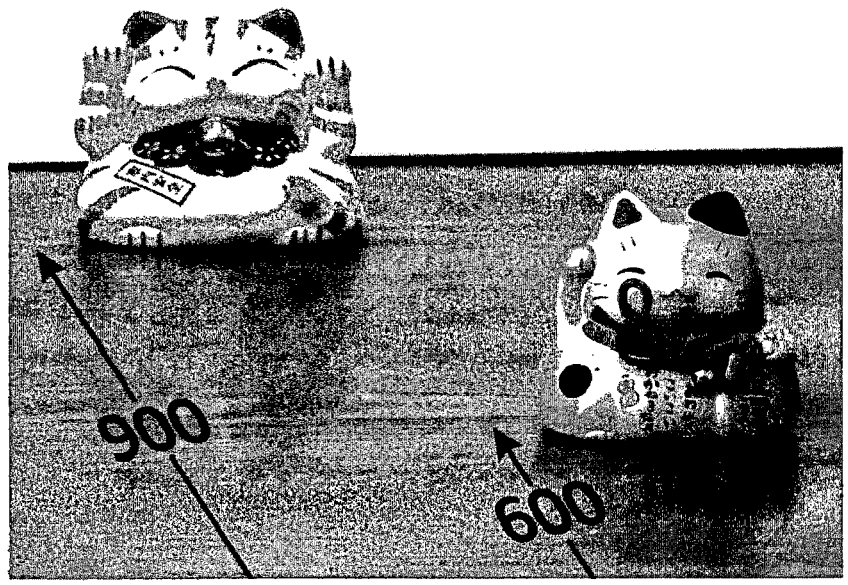
FIG. 10A, FIG. 10B, FIG. 10C and FIG. 10D show experimental photographs of imaging two separate Objects spaced apart along the optical axis.

Another set of experimental photographs, FIGS. 10A, 10B, 10C and 10D, relate to imaging of Objects, the "beckoning cats", spaced apart along the optical axis. FIG. 10A shows the relative positioning of the Objects and distances to them from optical systems of two types: a conventional objective, and a Multi-Focus Optical System implemented according to FIG. 2B that provides simultaneously the sharp images of two spaced apart objects.

Figure 10B:
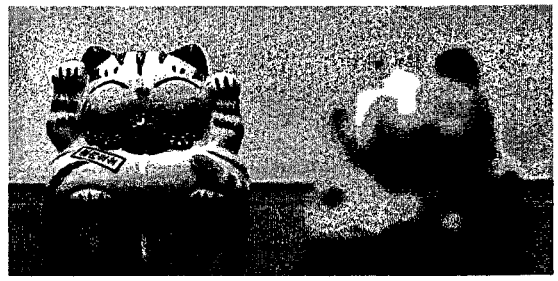
Figure 10C:

In the case of image acquisition with the conventional objective, FIGS. 10B and 10C, a sharp image is formed for only one of the Objects, while the image of another Object is blurred.

Figure 10D:
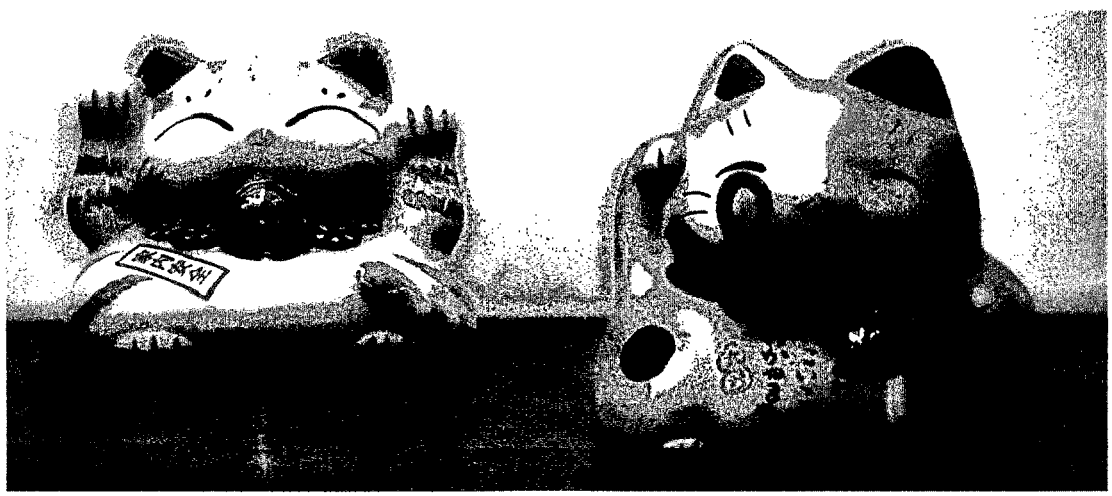

In the case of image acquisition using the Multi-Focus Optical System according to FIG. 2B, sharp images of both spaced apart Objects are formed in the Common Image Plane, FIG. 10D. Obviously, the contrast of the Common Image is good enough and acceptable for various applications in photography and cinematography. For example, this imaging mode allows to simultaneously capture sharp images of near and far located objects by realizing the "dolly zoom" effect in cinematography, when the simultaneous moving the camera and varying focal length of the zoom objective provide constant size of one of the objects while the size of the other object is constantly changing. Then the equal image contrast is ensured for the entire scene.

Obviously, the technical solutions according to the present invention, realizing a significant extension of the depth of field in object space or simultaneous formation of sharp images of spaced apart objects, are a powerful tool to significantly enhance the performance of imaging technics in various applications in modern photography, cinematography, machine vision and optical inspection.

The term "approximately"/"approximate" can be +/−10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical system with extended depth of field for imaging objects in a wide field of view, broad spectral band and a pre-set parallax for objects located at different distances, intended for use in photography, machine vision, optical inspection and cinematography imaging applications, the system comprising:

an illumination system that illuminates objects in object space with light intensity and a polarization state optimal for producing images with sharpness and contrast required in the imaging applications;

a multi-focus optical system having aplanatic and achromatic optical design in all its focuses, characterized by correction of spherical aberration, coma, astigmatism and chromatic aberrations for a wide field of view by imaging in a broad spectral band required in the imaging applications, comprising at least one multi-focus lens made of a birefringent optical material and implemented so the optic axis of the birefringent material of each of the multi-focus lenses forms an angle in the range from approximately 10° to approximately 90° with the optical axis of the lens;

said multi-focus optical system forms simultaneously in its common image plane the images of objects that are located in two or more object planes spaced apart along the optical axis and optically conjugate to said common image plane, as well as the images of objects located in object fields in proximity to said object planes;

a combination of the said object fields forms a common object field, which is characterized by extended depth of field in the object space;

transverse magnification and distortion realized in said multi-focus optical system provide a pre-set parallax for the objects located at different distances and optically conjugate to a common image plane of said multi-focus optical system; and an image pickup device used to capture and save images formed by the multi-focus optical system, wherein a sensing plane of the image pickup device is aligned with said common image plane of the multi-focus optical system.

2. The system according to claim 1, wherein the illumination system illuminates with polarized light different object planes, which are optically conjugate to the common image plane of the multi-focus optical system, wherein polarization directions of the lightings applied to the adjacent object planes are orthogonal to each other.

3. The system according to claim 1, wherein adjacent object fields, located along the optical axis in proximity to the object planes optically conjugate to the common image plane of the multi-focus optical system, overlap each other and form a broad continuous common object field, thereby providing an extended depth of field in the object space, where imaging with the sharpness and contrast required in the imaging applications is achieved.

4. The system according to claim 1, wherein the object fields, located along the optical axis in proximity to the object planes optically conjugate to the common image plane of the multi-focus optical system, are spaced apart, thereby providing imaging of individual scenes separated in the object space with the sharpness and contrast required in the imaging applications.

5. The system according to claim 1, wherein the multi-focus optical system comprises two or more multi-focus lenses, wherein at least one of the lenses is rotated around the optical axis to optimize conditions for sharp and contrast imaging either for the broad continuous common object field with extended depth or for individual scenes in the object space.

6. The system according to claim 1, wherein the multi-focus optical system is implemented as a multi-focus objective system having aplanatic and achromatic optical design in all its focuses and comprising one or more rotatable multi-focus lenses made of birefringent optical materials and implemented in such a way that the optic axis of the birefringent material of each of the multi-focus lenses forms an angle in the range from approximately 10° to approximately 90° with the optical axis of the lens; and the rotation of the said rotatable multi-focus lens or lenses is used to optimize conditions for sharp and contrast imaging either for the broad continuous common object field with extended depth or for individual scenes in the object space.

7. The system according to claim 1, wherein the multi-focus optical system is implemented as a combination of a single-focus objective having aplanatic and achromatic optical design and a multi-focus optical module extending depth of field and comprising one or more rotatable multi-focus lenses made of birefringent optical materials and implemented in such a way that the optic axis of the birefringent material of each of the multi-focus lenses forms an angle in the range from approximately 10° to approximately 90° with the optical axis of the lens; said optical module extending depth of field has aplanatic and achromatic optical design characterized by corrected spherical aberration, coma, astigmatism and chromatic aberrations for a wide field of view by imaging in broad spectral band required in the imaging applications; and the rotation of the said rotatable multi-focus lens or lenses is used to optimize conditions for sharp and contrast imaging either for the broad continuous common object field with extended depth or for individual scenes in the object space.

8. The system according to claim 1, wherein the multi-focus optical system comprises a single-focus zoom objective with variable focal length over a pre-determined range, and optical design of the multi-focus optical system extending depth of field has aplanatic and achromatic optical design characterized by corrected spherical aberration, coma, astigmatism and chromatic aberrations for a wide field of view by imaging in broad spectral band required in the imaging applications over an entire range of focal lengths of a zoom objective.

9. The system according to claim 1, wherein the multi-focus optical system is implemented as a telecentric objective with one or more multi-focus concentric meniscus lenses made of birefringent optical materials, wherein centers of curvature of spherical surfaces of the said one or more multi-focus concentric meniscus lenses coincide with a center of the diaphragm or aperture stop of a telecentric objective, and the optic axis of the birefringent material of each of the multi-focus concentric meniscus lenses forms an angle in the range from approximately 10° to approximately 90° with the optical axis of the lens.

10. The system according to claim 1, wherein the multi-focus optical system is implemented as a telecentric objective providing telecentricity in either object space or image space, or simultaneously in both the object space and the image space.

11. The system according to claim 1, wherein the image pickup device is implemented in a photo or a motion-picture camera with a film, and the film plane is aligned with the common image plane of the multi-focus optical system.

12. The system according to claim 1, wherein the image pickup device is implemented in a camera with an electronic image sensor, the sensing plane of which is aligned with the common image plane of the multi-focus optical system.

13. The system according to claim 12, wherein the electronic image sensor of the image pickup device is implemented in such a way that its different pixels preferentially pick up light polarized along different directions.

14. The system according to claim 1, wherein an electronic image sensor of the image pickup device is implemented in such a way that its different pixels preferentially pick up light polarized along different directions.

15. The system according to claim 1, wherein the multi-focus optical system comprises a rotatable wire-grid polarizer optimized for the spectral band of the said multi-focus optical system and installed with said multi-focus optical system, and rotation of this wire-grid polarizer is used to enhance, by polarization filtering, the image contrast and sharpness in the common image plane of the multi-focus optical system for images of objects located at different distances in the object space.

16. The system according to claim 1, wherein the multi-focus optical system comprises a rotatable waveplate optimized for the spectral band of said multi-focus optical system and installed either with said multi-focus optical system, and rotation of this waveplate is used to enhance image contrast and sharpness in the common image plane of the multi-focus optical system for images of objects located at different distances in the object space by lossless variation of energy portions in said images.

17. An optical system with extended depth of field for imaging objects in a wide field of view, broad spectral band and a pre-set parallax for objects located at different distances, for optical imaging applications, comprising:
   an illumination system that illuminates objects in object space with light intensity and a polarization state optimal for producing images with sharpness and contrast required in the imaging applications; and
   a multi-focus optical system comprising at least one multi-focus lens made of birefringent optical material and implemented so the optic axis of the birefringent material of each of the multi-focus lenses forms an angle in the range from approximately 10° to approximately 90° with the optical axis of the lens;
   said multi-focus optical system forms simultaneously in its common image plane the images of objects that are located in two or more object planes spaced apart along the optical axis and optically conjugate to said common image plane, as well as the images of objects located in object fields in proximity to said object planes;
   a combination of the said object fields forms a common object field, which is characterized by extended depth of field in the object space;
   transverse magnification and distortion realized in said multi-focus optical system provide a pre-set parallax for the objects located at different distances and optically conjugate to a common image plane of the said multi-focus optical system; and
   an image pickup device used to capture and save images formed by the multi-focus optical system, wherein a sensing plane of the image pickup device is aligned with said common image plane of the multi-focus optical system.

18. A method for providing high quality imaging of objects in a wide field of view and broad spectral band with extended depth of field in the object space and with a pre-set parallax for objects located at different distances, for imaging applications in photography, machine vision, optical inspection, and cinematography, the method comprising the steps of:
   providing an illumination system that illuminates objects in object space with light intensity and a polarization state optimal for producing images with sharpness and contrast required in the imaging applications;
   providing a multi-focus optical system having aplanatic and achromatic optical in all its focuses, characterized by correction of spherical aberration, coma, astigmatism and chromatic aberrations for a wide field of view by imaging in a broad spectral band required in the imaging applications, the
   providing the multi-focus optical system with at least one multi-focus lens made of a birefringent optical material implemented so the optic axis of the birefringent material of each of the multi-focus lenses forms an angle in the range from approximately 10° to approximately 90° with the optical axis of the lens;
   simultaneously forming said multi-focus optical system in its common image plane the images of objects that are located in two or more object planes spaced apart along the optical axis and optically conjugate to said common image plane, as well as the images of objects located in object fields in proximity to said object planes;
   forming a combination of the said object fields into a common object field, which is characterized by extended depth of field in the object space; transverse magnification and distortion realized in said multi-focus optical system which provides a pre-set parallax for the objects located at different distances and optically conjugate to a common image plane of said multi-focus optical system; and
   providing an image pickup device used to capture and save images formed by the multi-focus optical system, wherein a sensing plane of the image pickup device is aligned with said common image plane of the multi-focus optical system.

* * * * *